US012700128B2

(12) United States Patent
Kawai

(10) Patent No.: US 12,700,128 B2
(45) Date of Patent: Aug. 4, 2026

(54) DETECTION APPARATUS, DETECTION METHOD, AND NON-TRANSITORY STORAGE MEDIUM

(71) Applicant: NEC Corporation, Tokyo (JP)

(72) Inventor: Ryo Kawai, Tokyo (JP)

(73) Assignee: NEC CORPORATION, Tokyo (JP)

( * ) Notice: Subject to any disclaimer, the term of this patent is extended or adjusted under 35 U.S.C. 154(b) by 414 days.

(21) Appl. No.: 18/036,338

(22) PCT Filed: Nov. 20, 2020

(86) PCT No.: PCT/JP2020/043394
§ 371 (c)(1),
(2) Date: May 10, 2023

(87) PCT Pub. No.: WO2022/107312
PCT Pub. Date: May 27, 2022

(65) Prior Publication Data
US 2023/0410356 A1     Dec. 21, 2023

(51) Int. Cl.
*G06T 7/73* (2017.01)
*G06T 7/246* (2017.01)

(52) U.S. Cl.
CPC ............... *G06T 7/73* (2017.01); *G06T 7/246* (2017.01); *G06T 2207/30196* (2013.01); *G06T 2207/30268* (2013.01)

(58) Field of Classification Search
CPC ...... G06V 10/457; G06V 40/26; G06V 20/52; G06T 7/73; G06T 7/246; G06T 2207/30196; G06T 2207/30268; G08G 1/16
See application file for complete search history.

(56) References Cited

U.S. PATENT DOCUMENTS

2020/0278743 A1*  9/2020  Hiroki .................... G06F 3/011
2021/0107421 A1   4/2021  Uno

FOREIGN PATENT DOCUMENTS

JP      2016062414 A  *  4/2016
JP      2020-003936 A     1/2020
JP      2020-138701 A     9/2020

OTHER PUBLICATIONS

International Search Report for PCT Application No. PCT/JP2020/043394, mailed on Jan. 26, 2021.
Zhe Cao et al. "Realtime Multi-Person 2D Pose Estimation using Part Affinity Fields", The IEEE Conference on Computer Vision and Pattern Recognition (CVPR), 2017, p. 7291-7299.

* cited by examiner

*Primary Examiner* — Delomia L Gilliard
(74) *Attorney, Agent, or Firm* — Sughrue Mion, PLLC

(57) ABSTRACT

The present invention provides a detection apparatus (10) including an equipment information acquisition unit (12) that acquires equipment information indicating a position of equipment being present in an interior of a moving body, a person information generation unit (11) that determines a position of a person being present in the interior of the moving body, based on an image indicating the interior of the moving body, and generates person information indicating the position of the person, and detection unit (13) that detects a danger state occurring in the interior of the moving body, based on the equipment information and the person information.

11 Claims, 24 Drawing Sheets

DETECTION APPARATUS, DETECTION METHOD, AND NON-TRANSITORY STORAGE MEDIUM

This application is a National Stage Entry of PCT/JP2020/043394 filed on Nov. 20, 2020, the contents of all of which are incorporated herein by reference, in their entirety.

TECHNICAL FIELD

The present invention relates to a detection apparatus, a detection method, and a program.

BACKGROUND ART

By detecting, at an early stage, a danger state occurring in an interior of a moving body (a state where an accident can occur or a state where an accident has occurred), and taking a necessary measure, an accident in the interior of the moving body (falling or the like) can be suppressed, or aggravation of an accident can be suppressed. Patent Document 1 discloses a technique for avoiding falling or the like of a passenger in an interior of a moving body. Specifically, it is disclosed that a pose, a position, behavior, holding of a strap or a grip bar, and the like of a passenger are detected, and processing according to a detection result is executed. Note that, Non-Patent Document 1 discloses a technique for detecting a skeleton structure of a person.

RELATED DOCUMENT

Patent Document

[Patent Document 1] Japanese Patent Application Publication No. 2020-003936

Non-Patent Document

[Non-Patent Document 1] Zhe Cao, Tomas Simon, Shih-En Wei, Yaser Sheikh, "Realtime Multi-Person 2D Pose Estimation using Part Affinity Fields", The IEEE Conference on Computer Vision and Pattern Recognition (CVPR), 2017, P. 7291-7299

DISCLOSURE OF THE INVENTION

Technical Problem

Patent Document 1 does not disclose a specific achievement means for detecting a pose, a position, behavior, holding of a strap or a grip bar, and the like of a passenger. In order to accurately avoid an accident (falls or the like) in an interior of a moving body and aggravation of an accident, it is necessary to accurately detect a detection target.

An object of the present invention is to accurately detect a danger state occurring in an interior of a moving body.

Solution to Problem

The present invention provides a detection apparatus including:
an equipment information acquisition unit that acquires equipment information indicating a position of equipment being present in an interior of a moving body;
a person information generation unit that determines a position of a person being present in the interior of the moving body, based on an image indicating the interior of the moving body, and generates person information indicating the position of the person; and
a detection unit that detects a danger state occurring in the interior of the moving body, based on the equipment information and the person information.

Further, the present invention provides a detection method including,
by a computer:
acquiring equipment information indicating a position of equipment being present in an interior of a moving body;
determining a position of a person being present in the interior of the moving body, based on an image indicating the interior of the moving body, and generating person information indicating the position of the person; and
detecting a danger state occurring in the interior of the moving body, based on the equipment information and the person information.

Further, the present invention provides a program causing a computer to function as:
an equipment information acquisition unit that acquires equipment information indicating a position of equipment being present in an interior of a moving body;
a person information generation unit that determines a position of a person being present in the interior of the moving body, based on an image indicating the interior of the moving body, and generates person information indicating the position of the person; and
a detection unit that detects a danger state occurring in the interior of the moving body, based on the equipment information and the person information.

Advantageous Effects of Invention

The present invention enables to accurately detect a danger state occurring in an interior of a moving body.

BRIEF DESCRIPTION OF THE DRAWINGS

FIG. 17 is a diagram illustrating a detection example of a skeleton structure.

DESCRIPTION OF EMBODIMENTS

Hereinafter, example embodiments of the present invention will be described by use of the drawings. Note that, in all of the drawings, a similar component is assigned with a similar reference sign, and description thereof is omitted, as appropriate.

First Example Embodiment

"Outline"

A detection apparatus according to the present example embodiment detects a danger state occurring in an interior of a moving body, based on a relative positional relationship between a position of equipment and a position of a person computed based on equipment information indicating the position of the equipment being present in the interior of the moving body, and person information indicating the position of the person being present in the interior of the moving body. By determining based on the relative positional relationship between the position of the equipment and the position of the person, it becomes possible to accurately detect the danger state occurring in the interior of the moving body.

Further, the detection apparatus according to the present example embodiment detects a skeleton structure of a person included in an image (an image generated by use of an image sensor) capturing an interior of a moving body by a camera or the like, and determines, based on the detected skeleton structure of the person, a matter being related to the person such as a position or a pose of the person. In a method of detecting, based on a skeleton structure of a person included in an image generated by a camera or the like, a position, a pose, or the like of the person, some methods being robust against a change in a lighting condition are known. As in the detection apparatus according to the present example embodiment, an analysis being robust against a change in a lighting condition is achieved by detecting a skeleton structure of a person included in an image generated by a camera or the like, and detecting, based on the skeleton structure of the person, a position, a pose, or the like of the person. Then, it becomes possible to accurately detect a danger state occurring in an interior of a moving body regardless of a state of lighting.

"Configuration"

Next, a configuration of the detection apparatus will be described. First, one example of a hardware configuration of the detection apparatus will be described. Each functional unit of the detection apparatus is achieved by any combination of hardware and software mainly including a central processing unit (CPU) of any computer, a memory, a program loaded into a memory, a storage unit (can store a program stored from a stage of shipping an apparatus in advance, and also a program downloaded from a storage medium such as a compact disc (CD), a server on the Internet, or the like) such as a hard disk storing the program, and an interface for network connection. Then, those skilled in the art will appreciate that there are various modified examples to the achieving method and apparatus.

Figure 1:
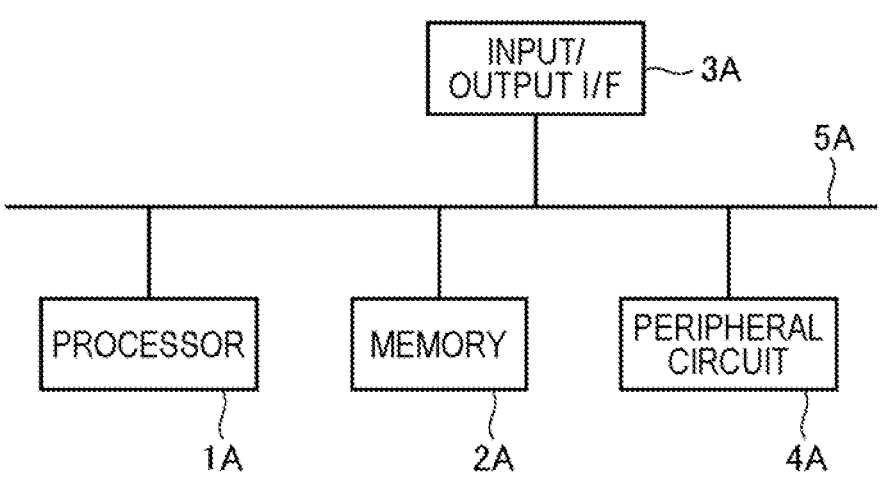
FIG. 1 is a diagram illustrating a hardware configuration example of a detection apparatus.

FIG. 1 is a block diagram illustrating the hardware configuration of the detection apparatus. As illustrated in FIG. 1, the detection apparatus includes a processor 1A, a memory 2A, an input/output interface 3A, a peripheral circuit 4A, and a bus 5A. The peripheral circuit 4A includes various modules. The detection apparatus may not include the peripheral circuit 4A. Note that, the detection apparatus may be configured by a plurality of physically and/or logically separated apparatuses, or may be configured by one apparatus being physically and/or logically integrated. When the detection apparatus is configured by a plurality of physically and/or logically separated apparatuses, each of the plurality of apparatuses can include the hardware configuration described above.

The bus 5A is a data transmission path through which the processor 1A, the memory 2A, the peripheral circuit 4A, and the input/output interface 3A transmit and receive data to and from one another. The processor 1A is, for example, an arithmetic processing apparatus such as a CPU, and a graphics processing unit (GPU). The memory 2A is, for example, a memory such as a random access memory (RAM) and a read only memory (ROM). The input/output interface 3A includes an interface for acquiring information from an input apparatus, an external apparatus, an external server, an external sensor, a camera, and the like, an interface for outputting information to an output apparatus, an external apparatus, an external server, and the like, and the like. The input apparatus is, for example, a keyboard, a mouse, a microphone, a physical button, a touch panel, and the like. The output apparatus is, for example, a display, a speaker, a printer, a mailer, and the like. The processor 1A can issue an instruction to each module, and perform an arithmetic operation, based on results of the operation.

Next, a functional configuration of the detection apparatus will be described. The detection apparatus is an apparatus to be installed on a moving body. One example of a moving body is exemplified by, but is not limited to, a vehicle (a bus or the like), a train, a ropeway, an elevator, a ship, an airplane, or the like. The detection apparatus is suitable for installation and utilization on a moving body in which a person being present in an interior may move while being in a standing state. The moving body may include a function (autonomous driving function) in which a system controls a moving operation (starting, stopping, accelerating, decelerating, changing of a travel direction, or the like) of the moving body, or may include a function (manual driving function) in which a person such as a driver controls a moving operation, or may include both of the functions.

Figure 2:
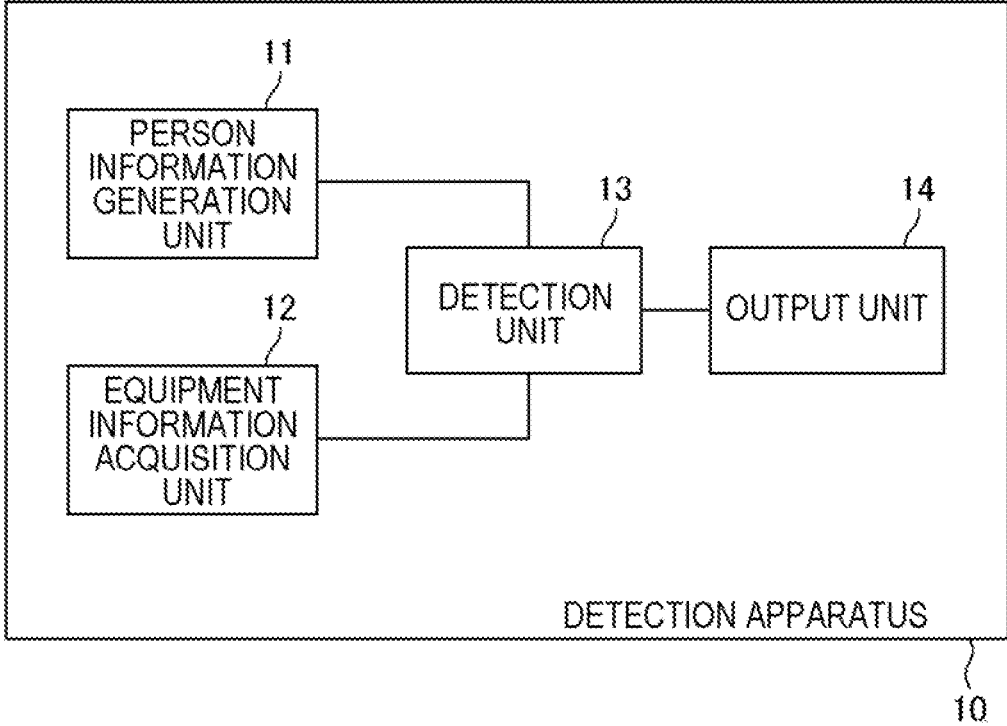
FIG. 2 is one example of a functional block diagram of the detection apparatus.

FIG. 2 illustrates one example of a functional block diagram of a detection apparatus 10. As illustrated, the detection apparatus 10 includes a person information generation unit 11, an equipment information acquisition unit 12, a detection unit 13, and an output unit 14.

The equipment information acquisition unit 12 acquires equipment information indicating a position of equipment being present in an interior of a moving body. Equipment whose position is indicated by equipment information is, for example, equipment provided for accident prevention in an interior of a moving body, and can include at least one of a strap, a handrail, and a seat. In addition, equipment whose position is indicated by equipment information is, for example, equipment that has a possibility of being involved in an accident in an interior of a moving body, and is exemplified by a door or a window. Note that, the exemplification herein is merely one example, and equipment whose position is indicated by equipment information is not limited to the exemplifications. Equipment information may be information associating information indicating a type of each piece of equipment (name of equipment, identification information, or the like) with a position of each piece of equipment.

A position of equipment is indicated by coordinates of a three-dimensional coordinate system (hereinafter, may be referred to as a "world coordinate system") having a predetermined position of a moving body as an origin and an x-axis, a y-axis, and a z-axis in predetermined directions. In the equipment information, a position of each piece of equipment may be indicated by coordinates of a representative point (one point or a plurality of points) of each piece of equipment. How to determine a representative point is a design matter. In addition, the equipment information may indicate a space occupied by each piece of equipment in the world coordinate system. A space occupied by each piece of equipment can be indicated by utilizing any well-known technique. For example, a space occupied by each piece of equipment may be indicated by coordinates of a plurality of points on an outer surface of each piece of equipment, may be indicated by a function indicating the outer surface of each piece of equipment, or may be indicated by another method.

Next, a method in which the equipment information acquisition unit 12 acquires equipment information will be described. The equipment information acquisition unit 12 can acquire equipment information, based on one of first to third acquisition examples below.

First Acquisition Example

In this example, equipment information indicating a position of each piece of equipment is generated in advance, and stored in a storage apparatus being accessible from the detection apparatus 10. Then, the equipment information acquisition unit 12 acquires the equipment information stored in the storage apparatus.

Second Acquisition Example

In this example, the equipment information acquisition unit 12 analyzes an image (an image generated by use of an image sensor) indicating an interior of a moving body generated by a camera, detects each piece of equipment in the image, and also determines a position and a type of each piece of the detected equipment. The equipment information acquisition unit 12 acquires, by real-time processing, an image generated by the camera, analyzes the image, and determines a latest position of each piece of equipment. The detection apparatus 10 and the camera are connected communicably with each other in a wired and/or wireless manner.

The camera may be fixed in position and orientation (orientation of an image capturing direction (optical axis direction)) in an interior of a moving body, or may be fixed in position and variable in orientation. In addition, the camera may be configured to be movable in an interior of a moving body, and may be capable of capturing an image while changing a position and an orientation. A means for changing an orientation of a camera fixed in position and a mode of changing an orientation (swinging in a predetermined direction with a predetermined swing width on a regular basis, or the like) are design matters, and any conventional technique can be adopted. Further, a means for moving a camera in an interior of a moving body (repeatedly moving at the same position along a lane, moving based on predetermined computer control with autonomous moving means, or the like) is not particularly limited, and any conventional technique can be adopted.

A means for analyzing an image and detecting each piece of equipment in the image is not particularly limited, but may be achieved by, for example, registering a feature value of an appearance of each piece of equipment in advance, and detecting the feature value within the image. Further, a means for determining a position in an interior of a moving body from a position within the image of each piece of equipment detected within the image (conversion means from an image coordinate system to a world coordinate system) is not particularly limited, and any conventional technique can be adopted.

Third Acquisition Example

In this example, the first acquisition example and the second acquisition example are combined. Specifically, equipment information indicating a position of equipment whose position in an interior of a moving body is invariable is acquired in the first acquisition example, and equipment information indicating a position of equipment whose position in an interior of a moving body is variable is acquired in the second acquisition example. Equipment whose position in an interior of a moving body is invariable is exemplified by a seat, a handrail, or the like. Equipment whose position is variable in an interior of a moving body is exemplified by a strap, a seat whose shape, state, or position is variable due to storing or folding (an auxiliary seat or the like), or the like.

The person information generation unit 11 analyzes an image (an image generated by use of an image sensor) indicating an interior of a moving body generated by a camera, detects a skeleton structure of a person included in the image, and generates, based on the detected skeleton structure, various pieces of information relating to the detected person. The person information generation unit 11 acquires, by real-time processing, an image generated by the camera, analyzes the image, and generates various pieces of information relating to the person. The detection apparatus 10 and the camera are connected communicably with each other in a wired and/or wireless manner. Since description of the camera has been given above, description herein is omitted.

Detection of a skeleton structure of a person is achieved by use of a skeleton detection technique such as OpenPose disclosed in Non-Patent Document 1. A skeleton structure to be detected is composed of a "keypoint" being a characteristic point such as a joint, and a "bone (bone link)" indicating a link between keypoints. The "keypoint" is associated with, for example, a "joint" of a person, and the "bone" is associated with, for example, a "bone" of a person.

Figure 3:
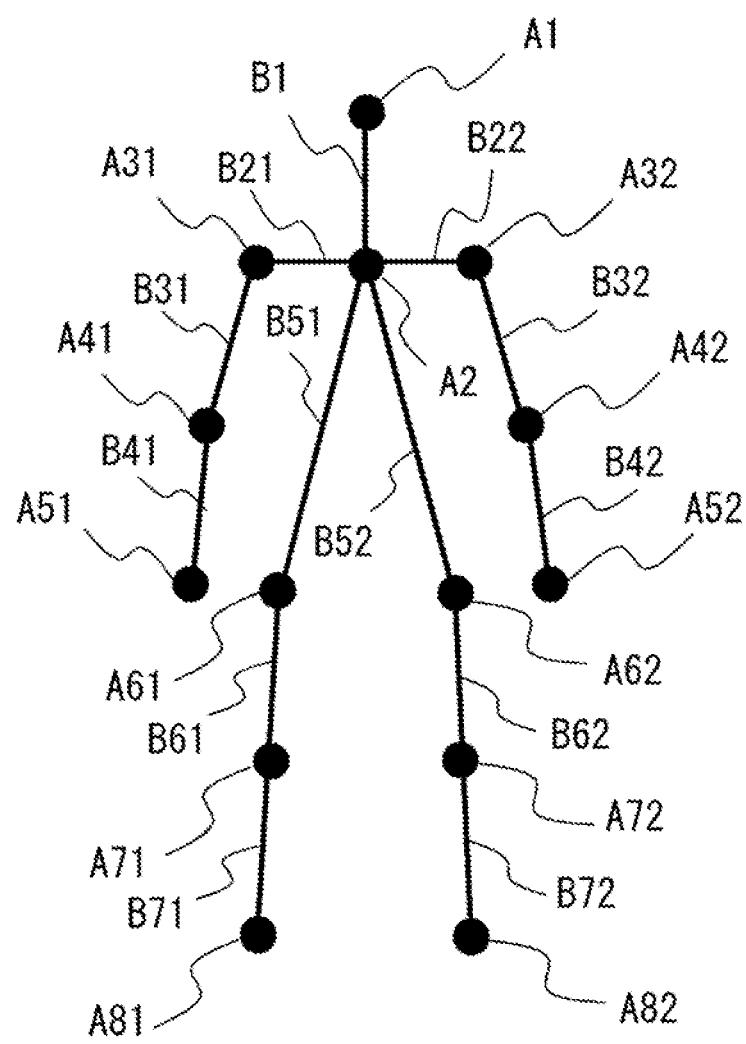
FIG. 3 is a diagram illustrating an example of a human model.
Figure 4:
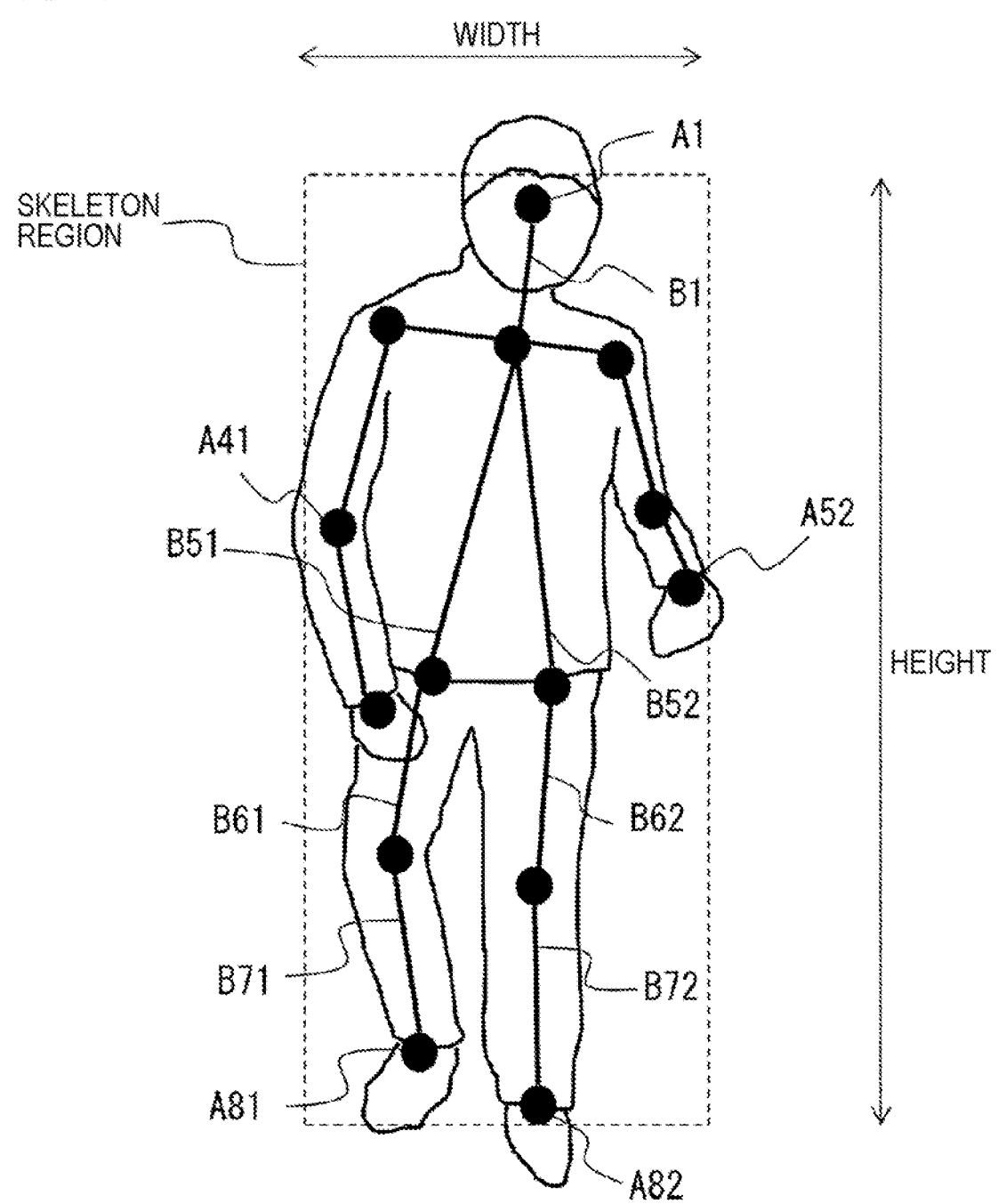
FIG. 4 is a diagram illustrating a detection example of a skeleton structure.
Figure 5:
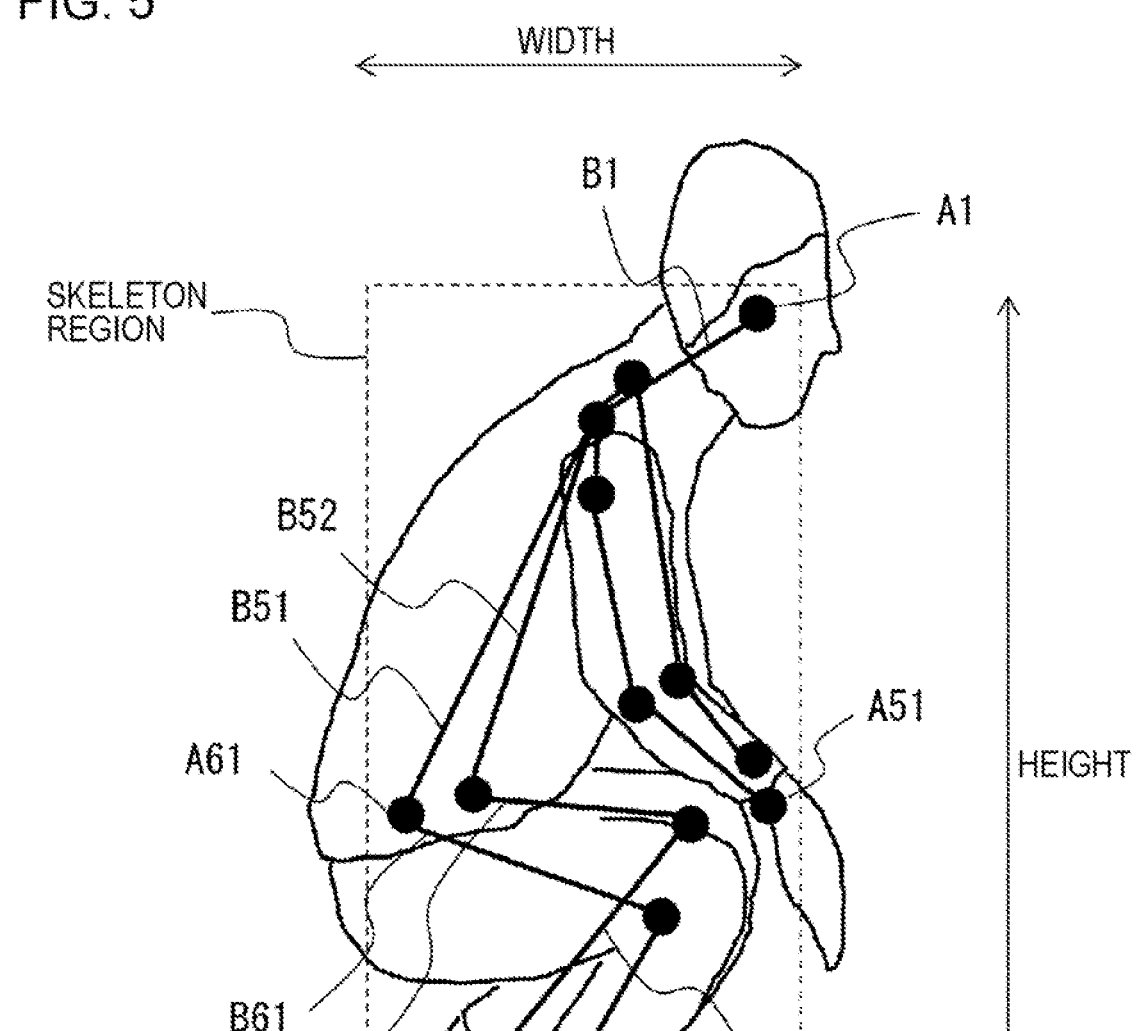
FIG. 5 is a diagram illustrating a detection example of a skeleton structure.
Figure 6:
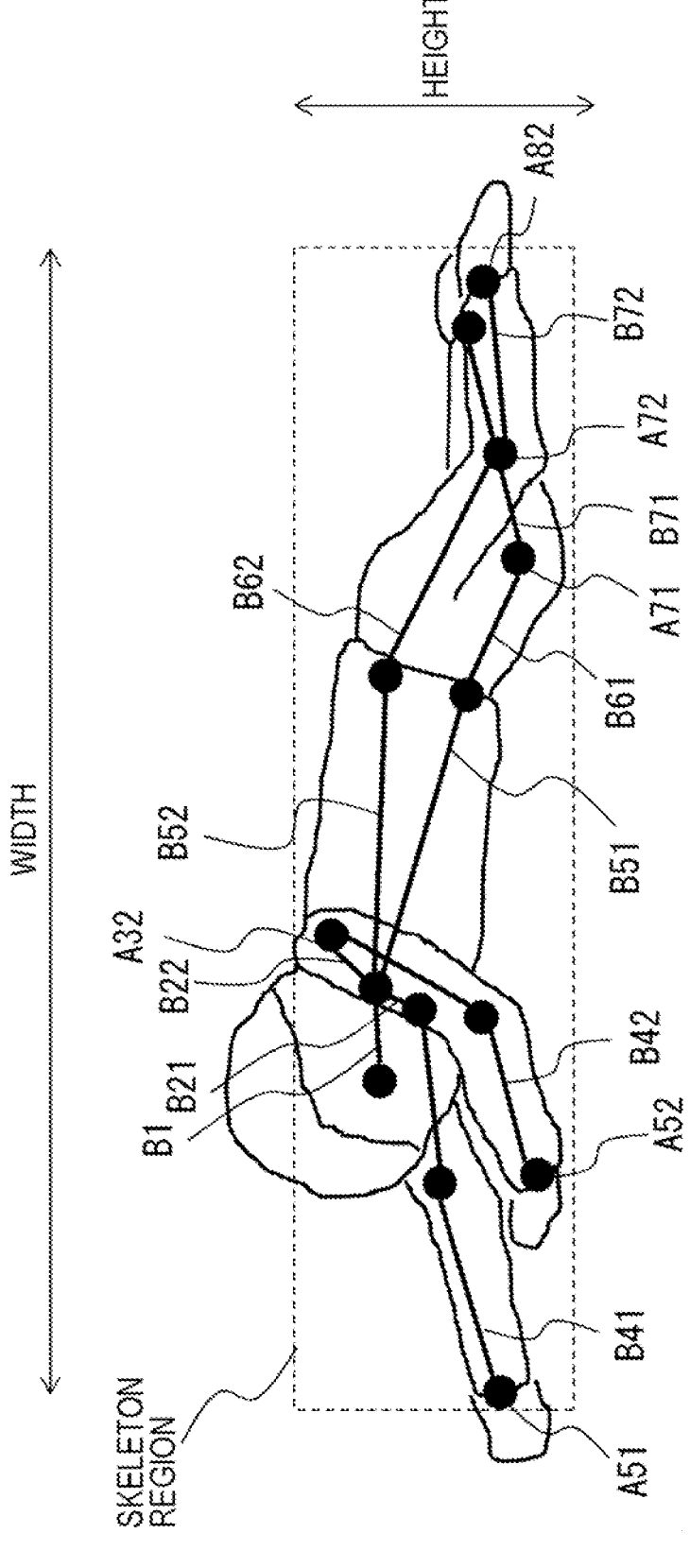
FIG. 6 is a diagram illustrating a detection example of a skeleton structure.

FIG. 3 illustrates one example of a skeleton structure detected from a two-dimensional image by use of a skeleton detection technique such as OpenPose. FIGS. 4 to 6 each illustrate a detection example of a skeleton structure.

The person information generation unit 11 extracts, for example, a feature point that can become a keypoint from an image, and detects each keypoint of a person with reference to information acquired by machine-learning the image of the keypoint. In the example of FIG. 3, a head A1, a neck A2, a right shoulder A31, a left shoulder A32, a right elbow A41, a left elbow A42, a right hand A51, a left hand A52, a right waist A61, a left waist A62, a right knee A71, a left knee A72, a right foot A81, and a left foot A82 are detected as keypoints of a person. Further, as bones of the person coupling the keypoints, a bone B1 connecting the head A1 to the neck A2, a bone B21 and a bone B22 connecting the neck A2 to the right shoulder A31 and the left shoulder A32, respectively, a bone B31 and a bone B32 connecting the right shoulder A31 and the left shoulder A32 to the right elbow A41 and the left elbow A42, respectively, a bone B41 and a bone B42 connecting the right elbow A41 and the left elbow A42 to the right hand A51 and the left hand A52, respectively, a bone B51 and a bone B52 connecting the neck A2 to the right waist A61 and the left waist A62, respectively, a bone B61 and a bone B62 connecting the right waist A61 and the left waist A62 to the right knee A71 and the left knee A72, respectively, and a bone B71 and a bone B72 connecting the right knee A71 and the left knee A72 to the right foot A81 and the left foot A82, respectively are detected.

FIG. 4 is an example of detecting a skeleton structure of a person in an upright state. In FIG. 4, an image of the upright person is captured from front, the bone B1, the bone B51 and the bone B52, the bone B61 and the bone B62, and the bone B71 and the bone B72 viewed from front are each detected without overlapping, and the bone B61 and the bone B71 of the right foot are slightly bent more than the bone B62 and the bone B72 of the left foot.

FIG. 5 is an example of detecting a skeleton structure of a person in a squatting state. In FIG. 5, an image of the squatting person is captured from a right side, and the bone B1, the bone B51 and the bone B52, the bone B61 and the bone B62, and the bone B71 and the bone B72 viewed from the right side are each detected, and the bone B61 and the bone B71 of the right foot and the bone B62 and the bone B72 of the left foot are greatly bent and overlap.

FIG. 6 is an example of detecting a skeleton structure of a person in a state of lying down (a lying state, a collapsed state, or the like). In FIG. 6, an image of the person lying down is captured from left obliquely front, and the bone B1, the bone B51 and the bone B52, the bone B61 and the bone B62, and the bone B71 and the bone B72 viewed from left obliquely front are each detected, and the bone B61 and the bone B71 of the right foot and the bone B62 and the bone B72 of the left foot are bent and overlap.

Next, an example of information (person information) relating to a person generated based on a detected skeleton structure will be described. The person information generation unit 11 can generate at least one of a plurality of pieces of person information exemplified below, for each skeleton structure (for each person) detected within an image.

First Person Information Example

The person information generation unit 11 can extract a feature value from the skeleton structure described above, and determine the extracted feature value as person information. The feature value of the skeleton structure indicates a feature of a skeleton of a person, and a pose of the person can be estimated based on the feature value, or the same person included in different images can be determined (tracking of a person within an image).

Normally, the feature value includes a plurality of parameters. The feature value may be a feature value of the whole skeleton structure, may be a feature value of a part of the skeleton structure, or may include a plurality of feature values such as each part of the skeleton structure. A computation method of a feature value may be any method such as machine learning or normalization, and a minimum value or a maximum value may be derived as normalization. As one example, the feature value is a feature value acquired by machine-learning a skeleton structure, a size of a skeleton structure on an image from a head portion to a foot portion, or the like. A size of a skeleton structure is a height, an area, or the like of a skeleton region in an up-down direction including a skeleton structure on an image. The up-down direction (a height direction or a vertical direction) is an up-down direction (Y-axis direction) in the image, and is, for example, a direction being perpendicular to the ground (reference surface). Further, a left-right direction (horizontal direction) is a left-right direction (X-axis direction) in the image, and is, for example, a direction being parallel to the ground.

For example, when a height or an area of a skeleton region is determined as a feature value, the person information generation unit 11 extracts a region including a skeleton structure, and derives a height (a pixel number) or an area (a pixel area) of the region. The height and the area of the skeleton region are derived from coordinates of an end of the skeleton region to be extracted or coordinates of a keypoint at an end.

In the example of FIG. 4, a skeleton region including all bones is extracted from the skeleton structure of the upright person. In this case, an upper end of the skeleton region is the keypoint A1 of the head portion, a lower end of the skeleton region is the keypoint A82 of the left foot, a left end of the skeleton region is the keypoint A41 of the right elbow, and the right end of the skeleton region is the keypoint A52 of the left hand. Thus, a height of the skeleton region is derived from a difference between Y coordinates of the keypoint A1 and the keypoint A82. Further, a width of the skeleton region is derived from a difference between X coordinates of the keypoint A41 and the keypoint A52, and an area is derived from the height and width of the skeleton region.

In the example of FIG. 5, a skeleton region including all bones is extracted from the skeleton structure of the squatting person. In this case, an upper end of the skeleton region is the keypoint A1 of the head portion, a lower end of the skeleton region is the keypoint A81 of the right foot, a left end of the skeleton region is the keypoint A61 of the right waist, and a right end of the skeleton region is the keypoint A51 of the right hand. Thus, a height of the skeleton region is derived from a difference between Y coordinates of the keypoint A1 and the keypoint A81. Further, a width of the skeleton region is derived from a difference between X coordinates of the keypoint A61 and the keypoint A51, and an area is derived from the height and width of the skeleton region.

In the example of FIG. 6, a skeleton region including all bones is extracted from the skeleton structure of the person lying down. In this case, an upper end of the skeleton region is the keypoint A32 of the left shoulder, a lower end of the skeleton region is the keypoint A52 of the left hand, a left end of the skeleton region is the keypoint A51 of the right hand, and a right end of the skeleton region is the keypoint A82 of the left foot. Thus, a height of the skeleton region is derived from a difference between Y coordinates of the keypoint A32 and the keypoint A52. Further, a width of the skeleton region is derived from a difference between X coordinates of the keypoint A51 and the keypoint A82, and an area is derived from the height and width of the skeleton region.

Note that, although various pieces of processing can be performed by use of a feature value of a skeleton structure as described above, it is preferable to perform various pieces of processing by use of a feature value, among a plurality of types of feature values, being suitable for each piece of processing. For example, in processing of determining the same person included in different images, it is preferable to use a feature value that is not affected by an orientation or a pose of the person.

Second Person Information Example

The person information generation unit 11 can determine, based on a detected skeleton structure of a person, a position of the person being present in an interior of a moving body, and generate person information indicating the position of the person. The person information generation unit 11 can generate information indicating a position of a predetermined place of a body of a person as the person information indicating the position of the person. The predetermined place can be at least one of a plurality of keypoints and a plurality of bones indicated by the skeleton structure. The predetermined place may be, for example, the right foot A81 or the left foot A82, or may be another place. Note that, when the right foot A81 or the left foot A82 is hidden, a height of the person may be estimated by use of an existing method, and a position of the right foot A81 or the left foot A82 may be estimated from the estimated height and a position of the head A1. A means for determining a position in an interior of a moving body from a position within an image of each person detected within the image (a conversion means from an image coordinate system to a world coordinate system) is not particularly limited, and any conventional technique can be adopted.

Third Person Information Example

The person information generation unit 11 can generate person information indicating a relative positional relationship between a position of equipment and a position of a person, based on equipment information acquired by the equipment information acquisition unit 12. The relative positional relationship is a distance or the like in the world coordinate system. For example, the person information generation unit 11 can derive a distance between a position of a predetermined place of a body of the person and a position of each piece of equipment indicated by the equipment information. Note that, when the equipment information indicates a space occupied by each piece of equipment in the world coordinate system, a distance between a position of a predetermined point in the space (a point where a distance from a position of the predetermined place of the body of the person is the shortest, or the like) and a position of the predetermined place of the body of the person may be derived.

As one example, the person information generation unit 11 may compute a distance between the right hand A51 or the left hand A52 and equipment (a strap, a handrail, or the like) held by a hand.

In addition, the person information generation unit 11 may compute a distance between a predetermined place (the right foot A81, the left foot A82, or the like) of the body of the person and a door.

Fourth Person Information Example

The person information generation unit 11 can determine, based on a detected skeleton structure of a person, a pose of the person, and generate person information indicating the pose of the person. A pose to be determined is standing, sitting, lying down (lying, collapsed, or the like), or the like. The person information generation unit 11 can estimate the pose of each person, based on a feature value of the skeleton structure of the person described above. For example, a pose of a person in each skeleton structure may be estimated by use of an estimation model generated by machine-learning based on learning data in which a feature value of the skeleton structure and identification information (name or the like) of a pose are associated with each other.

Fifth Person Information Example

The person information generation unit 11 can determine a reference point, based on a plurality of predetermined places in a skeleton structure of a detected person, and generate person information further indicating a time change of a position of the reference point (a coordinate in the world coordinate system). The time change of the position of the reference point is utilized in order to determine, for example, whether the person is moving, simply making such motion as shaking, or the like. Thus, a plurality of places used for determination of a reference point become suitable places for the detection. For example, a plurality of places used for determination of a reference point may be keypoints included in a lower body (the right waist A61, the left waist A62, the right knee A71, the left knee A72, the right foot A81, and the left foot A82 in FIG. 3), may be all keypoints of a skeleton structure, or may be other places.

A reference point can be derived by, for example, any computation formula based on coordinates of a plurality of places used for determination of the reference point. For example, for each of an x-coordinate, a y-coordinate, and an z-coordinate, an average value of values of coordinates of a plurality of places used for determination of a reference point may be derived, and determined as coordinates of the reference point.

The detection unit 13 detects a danger state occurring in an interior of a moving body, based on equipment information and person information. The danger state is at least one of a state where an accident (falling or the like) is likely to occur in the interior of the moving body, and an accident (falling or the like) occurring in the interior of the moving body.

Note that, the detection unit 13 may acquire moving body state information indicating a state of a moving body, and detect a danger state by a detection method according to the state of the moving body. A state of a moving body to be detected includes at least one of moving, stopping, using a wiper, turning on a winker, a state where a door is open, a state where a door is closed, a state where a window is open, a state where a window is closed, and a velocity.

The detection unit 13 may analyze an image captured in such a way as to include the pieces of equipment and detect states thereof, or may acquire, from a system (an electronic control unit or the like) of a moving body that controls an operation of the pieces of equipment, information indicating each piece of equipment. The following can be considered as an example of detecting the above state by an image analysis. For example, whether a moving body is moving or stopping may be detected based on whether scenery outside a moving body seen through a window or a door changes. Detection of using a wiper, turning on a winker, a state where a door is open, a state where a door is closed, a state where a window is open, and a state where a window is closed can be achieved by detecting, from an image, a feature of appearance of each piece of equipment specific to a time of each state.

Next, an example of a detection method of a danger state will be described. The detection unit 13 can detect a danger state by use of at least one of a plurality of detection methods exemplified below.

—First Detection Method—

The detection unit 13 can detect, as a danger state, a state where a person standing without holding a strap or a handrail is present, when a state of a moving body is a predetermined state.

The predetermined state of the moving body is, for example, "moving". There is a possibility that a sudden steering wheel operation or deceleration operation for ensuring safety always occurs even during simply moving, and application of inertial force resulting therefrom to a person being present in a moving body can cause an accident such as falling.

In addition, the predetermined state of the moving body may be "moving" and "turning on a winker". Turning on a winker may indicate a previous announcement or actual occurrence of turning left or right of the moving body, deceleration for stopping, acceleration for overtaking, or the like, and application of inertial force resulting therefrom to a person being present in a moving body can cause an accident such as falling.

In addition, the predetermined state of the moving body may be "moving" and "using a wiper". There is a possibility that it rains when a wiper is used, and an interior of the moving body is in a wet and slippery state. Then, an accident resulting therefrom can be caused.

In addition, the predetermined state of the moving body may be "moving", "turning on a winker", and "using a wiper".

Detection of a standing person can be achieved based on pose information of the person. Whether the person is holding a strap or a handrail can be determined based on a distance between the right hand A51 or left hand A52 of the person and the pieces of equipment (a nearest strap, handrail, and the like). The detection unit 13 determines that the person is holding the equipment when the distance is equal to or less than a threshold value, or determines that the person is not holding the equipment when the distance is larger than the threshold value.

Note that, the threshold value may be changed based on a state of a moving body. For example, when the state of the moving body is a state where an accident is relatively prone to occur, such as "turning on a winker", "using a wiper", or "running at equal to or more than a velocity V", the threshold value may be set to be made smaller than in another state. A distance between the right hand A51 or left hand A52 of the person and the pieces of equipment can be different between a state where a strap or a handrail is firmly held and a state where, for example, a fingertip is only put on a strap or a handrail. Specifically, the distance becomes smaller when a strap or a handrail is firmly held. Thus, in a state where an accident is relatively prone to occur, the threshold value is set to be smaller than in another state, and "a state where a strap or a handrail is firmly held" may be detected as "a state where a strap or a handrail is held".

—Second Detection Method—

When a state of a moving body is a predetermined state, the detection unit 13 can detect, as a danger state, a state where a person who is moving without holding a strap or a handrail is present. The predetermined state of the moving body is as described in the first detection method.

Detection of a moving person can be achieved based on whether a time change of the reference point described in the above fifth person information example satisfies a predetermined condition. The predetermined condition is that a feature (design matter) appearing in the time change is present in a case of moving. Whether a strap or a handrail is held can be determined similarly to the first detection method.

—Third Detection Method—

The detection unit 13 can detect, as a danger state, a state where a person being stationary near a door for equal to or more than a predetermined time (design matter) is present when a state of a moving body is "a state where a door is open". In a case of a state where a door is open, it is considered that getting on and off via the door is performed. On the other hand, it is considered that a person being stationary near the door for equal to or more than a predetermined time during the state has no intention of getting on and off, and is merely standing on the spot. When such a person is present near the door, an accident such as a collision between the person and a person getting on and off can occur.

Detection of a person being stationary near a door for equal to or more than a predetermined time (design matter) can be achieved based on a time change of a distance between the door and the person.

—Fourth Detection Method—

The detection unit 13 can detect, as a danger state, a state where a person sitting or lying down in a place other than a seat is present. There is a possibility that a person sitting or lying down in a place other than a seat is a person who has fallen. Further, a person sitting or lying down in a place other than a seat is in poor physical condition, and has a possibility of easily falling or colliding with equipment due to shaking or the like of a moving body. Further, a person sitting or lying down in a place other than a seat becomes an interference with another person, and an accident such as a collision between the person and the another person can occur.

Detection of a person in a sitting state and a person in a state of lying down can be achieved based on pose information of the person. Then, sitting or lying down in a place other than a seat can be determined based on a positional relationship between the person and the seat.

When the detection unit 13 detects a danger state occurring in an interior of a moving body, the output unit 14 outputs information indicating the fact. The output unit 14 may further output information indicating a content (detection of a person standing without holding a strap or a handrail, or the like) of the detected danger state.

For example, the above information may be notified to a manager (a driver, a conductor, or the like) of a moving body, or may be notified to another person (a passenger or the like) being present in the moving body. A notification means is not particularly limited, and can be achieved via any output apparatus such as a display, a speaker, a warning lamp, or a projection apparatus.

In addition, when a moving body includes an autonomous driving function, the information may be input to a system that controls the autonomous driving. The system controls an operation of the moving body, based on the input information.

Next, one example of a flow of processing of the detection apparatus 10 will be described by use of FIGS. 7 to 9.

Figure 7:
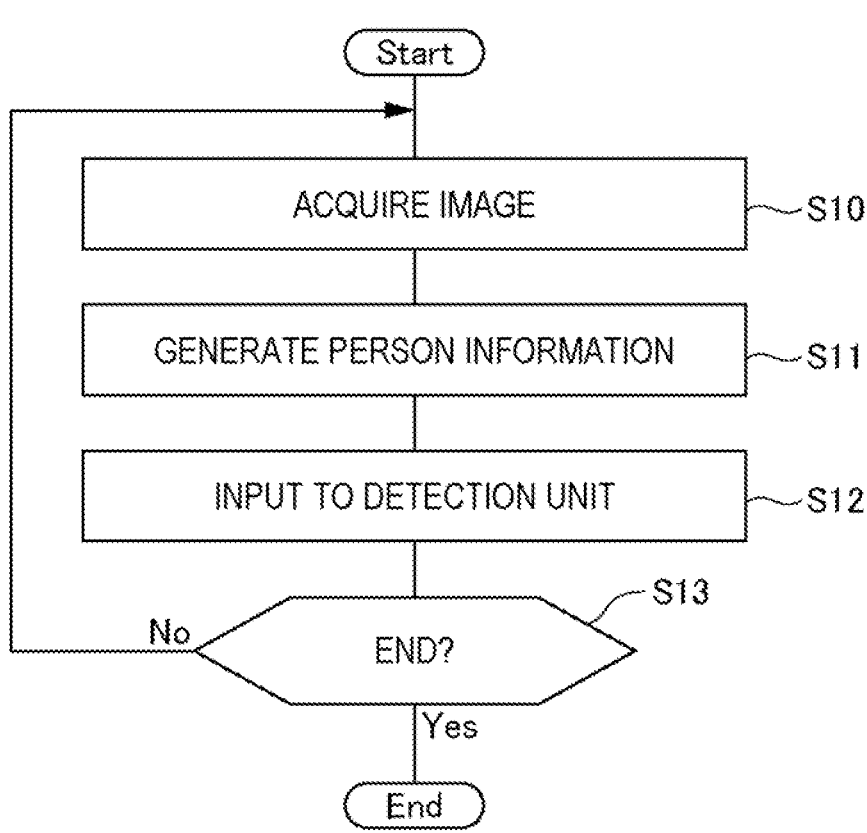
FIG. 7 is a flowchart illustrating one example of a flow of processing in the detection apparatus.

Processing illustrated in a flowchart in FIG. 7 illustrates a flow of processing when generation of equipment information based on an image generated by a camera that captures an image of an interior of a moving body is not executed (the first acquisition example described above).

When the detection apparatus 10 acquires an image generated by a camera that captures an image of an interior of a moving body (S10), the person information generation unit 11 analyzes the image and generates person information (S11). Then, the person information generation unit 11 inputs the generated person information to the detection unit 13 (S12). Thereafter, similar processing is repeated. Note that, since details of the pieces of processing have been described above, description herein is omitted.

Figure 8:
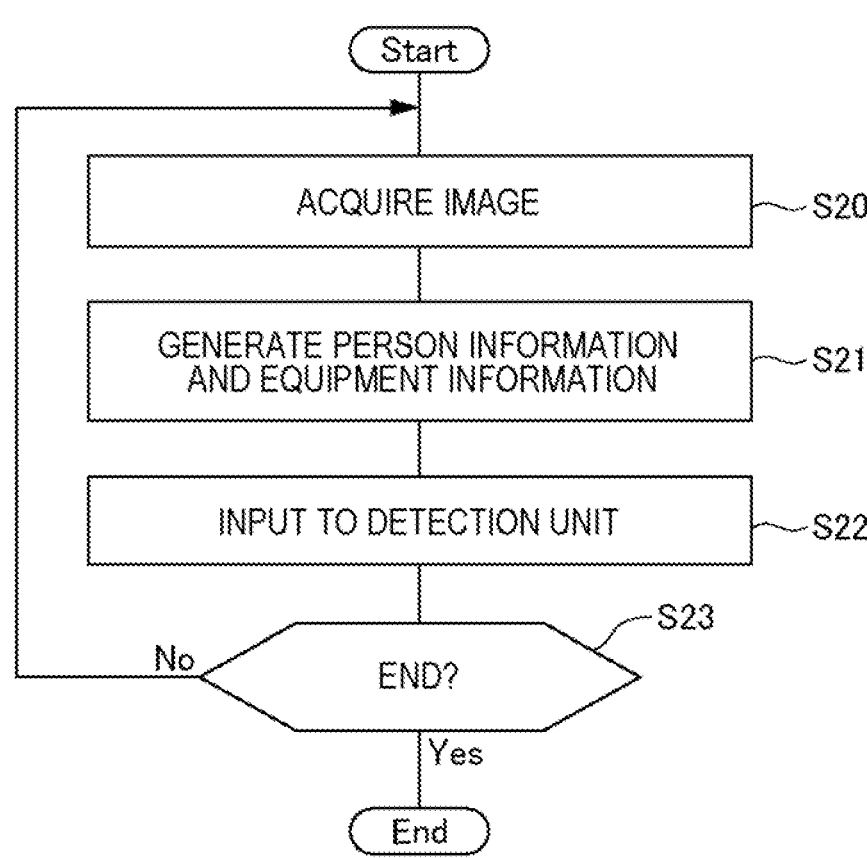
FIG. 8 is a flowchart illustrating one example of a flow of processing in the detection apparatus.

Processing illustrated in a flowchart in FIG. 8 illustrates a flow of processing when generation of equipment information based on an image generated by a camera that captures an image of an interior of a moving body is executed (the second acquisition example or the third acquisition example described above).

When the detection apparatus 10 acquires an image generated by a camera that captures an image of an interior of a moving body (S20), the person information generation unit 11 analyzes the acquired image and generates person information, and the equipment information acquisition unit 12 analyzes the acquired image and generates equipment information (S21). Then, the person information generation unit 11 inputs the generated person information to the detection unit 13, and the equipment information acquisition unit 12 inputs the generated equipment information to the detection unit 13 (S22). Thereafter, similar processing is repeated. Note that, since details of the pieces of processing have been described above, description herein is omitted.

Figure 9:
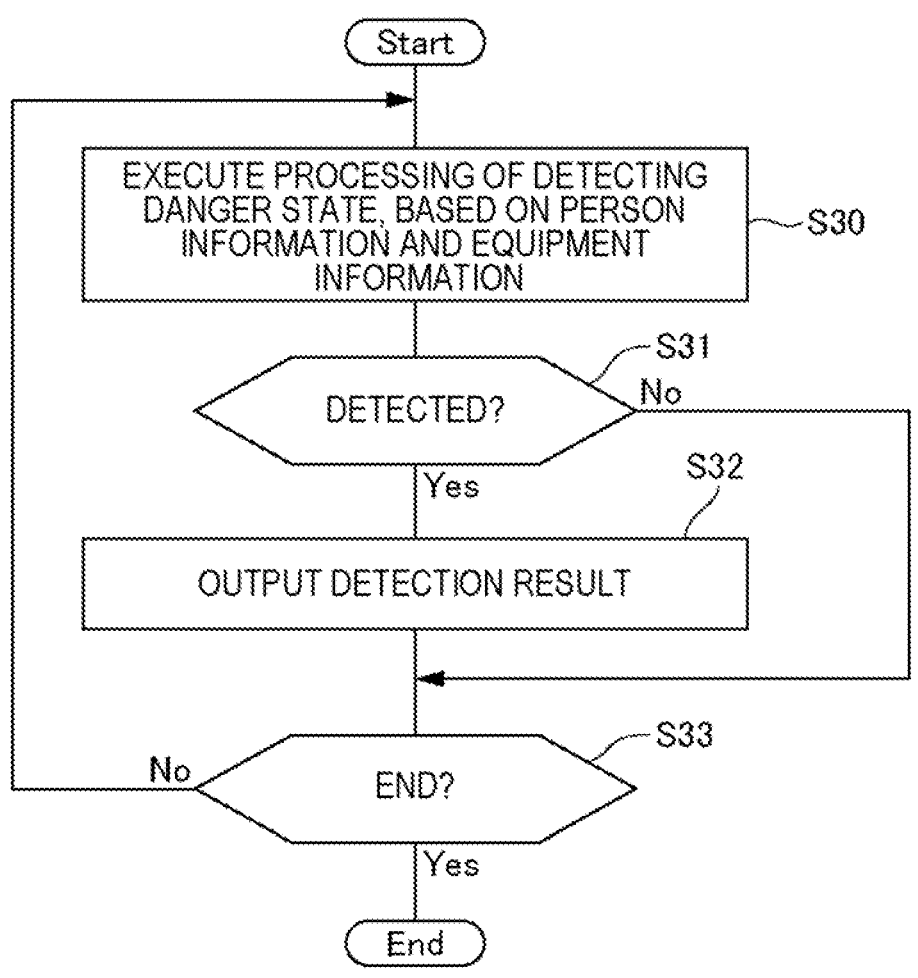
FIG. 9 is a flowchart illustrating one example of a flow of processing in the detection apparatus.

A flowchart in FIG. 9 is executed by the detection unit 13 and the output unit 14. The detection unit 13 executes processing of detecting a danger state occurring in an interior of a moving body, based on person information generated by the person information generation unit 11 and equipment information acquired by the equipment information acquisition unit 12 (S30). Then, when a danger state is detected by the detection unit 13 (Yes in S31), the output unit 14 outputs information indicating the fact (S32). The output unit 14 can notify the above fact to a manager (a driver, a conductor, or the like) of the moving body and/or another person (a passenger or the like) being present in the moving body via any output apparatus such as a display, a speaker, a warning lamp, or a projection apparatus. Thereafter, similar processing is repeated.

Advantageous Effect

The detection apparatus 10 detects a danger state occurring in an interior of a moving body, based on a relative positional relationship between a position of equipment and a position of a person computed based on equipment information indicating a position of the equipment being present in the interior of the moving body and person information indicating a position of the person being present in the interior of the moving body. By determining based on the relative positional relationship between the position of the equipment and the position of the person, it becomes possible to accurately detect the danger state occurring in the interior of the moving body.

Further, the detection apparatus 10 can detects a danger state occurring in an interior of a moving body, based on a relative positional relationship between a predetermined place of a body of a person and equipment (a relative positional relationship between a hand and a strap or a handrail). According to such a detection apparatus 10, it becomes possible to accurately detect a danger state occurring in an interior of a moving body.

Further, the detection apparatus 10 detects a skeleton structure of a person included in an image (an image generated by use of an image sensor) of an interior of a moving body captured by a camera or the like, and determines a matter being related to the person such as a position or a pose of the person, based on the detected skeleton structure of the person. In a method of detecting a position, a pose, or the like of a person, based on a skeleton structure of the person included in an image generated by a camera or the like, some methods being robust against a change in a lighting condition are known. As in the detection apparatus 10, detecting a skeleton structure of a person included in an image generated by a camera or the like, and detecting a position, a pose, or the like of the person, based on the skeleton structure of the person achieves an analysis being robust against a change in a lighting condition. Then, it becomes possible to accurately detect a danger state occurring in the interior of the moving body regardless of a state of lighting.

Further, the detection apparatus 10 can detect a danger state occurring in an interior of a moving body by a detection method according to a state of the moving body. Some of states that can occur in an interior of a moving body may or may not become dangerous according to a state of the moving body. The detection apparatus 10 that can detect a danger state occurring in an interior of a moving body by a detection method according to a state of the moving body can accurately detect a truly dangerous state as a danger state occurring in the interior of the moving body.

Second Example Embodiment

Hereinafter, a second example embodiment will be described with reference to the drawings. In the second example embodiment, a specific example of computing a feature value of a skeleton structure in the first example embodiment will be described. In the second example embodiment, a feature value is derived by normalizing by use of a height of a person. The second example embodiment is similar in other points to the first example embodiment.

A person information generation unit 11 computes (estimates), based on a detected skeleton structure, a height (referred to as a height pixel number) of a person within an image when upright. It can also be said that a height pixel number is a height of a person in an image (a length of the whole body of the person on a two-dimensional image space). The person information generation unit 11 derives a height pixel number (number of pixels) from a length (length on a two-dimensional image space) of each bone of the detected skeleton structure.

In the following examples, specific examples 1 to 3 are used as a method for deriving a height pixel number. Note that, any method of the specific examples 1 to 3 may be used, or a plurality of any selected methods may be combined and used. In the specific example 1, a height pixel number is derived by adding up lengths of bones from a head portion to a foot portion among bones of a skeleton structure. When a top of a head and a foot are not detected, correction can also be performed by multiplication by a constant as necessary. In the specific example 2, a height pixel number is computed by use of a human model indicating a relationship between a length of each bone and a length of a whole body (a height on the two-dimensional image space). In the specific example 3, a height pixel number is computed by fitting (applying) a three-dimensional human model to a two-dimensional skeleton structure.

The person information generation unit 11 normalizes a skeleton structure (skeleton information) of a person, based on a computed height pixel number of the person. The person information generation unit 11 normalizes, by the height pixel number, a height on an image of each keypoint (feature point) included in the skeleton structure. For example, a height direction is an up-down direction (Y-axis direction) in a two-dimensional coordinate (X-Y coordinate) space of an image. In this case, a height of a keypoint can be derived from a value (pixel number) of a Y coordinate of the keypoint. Alternatively, a height direction may be a direction (vertical projection direction) of a vertical projection axis in which a direction of a vertical axis perpendicular to the ground (reference surface) in a three-dimensional coordinate space in a real world is projected in the two-dimensional coordinate space. In this case, a vertical projection axis in which an axis perpendicular to the ground in the real world is projected in the two-dimensional coordinate space, based on a camera parameter, is derived, and a height of a keypoint can be derived from a value (pixel number) along the vertical projection axis. Note that, the camera parameter is a capturing parameter of an image, and, for example, the camera parameter is a pose, a position, a capturing angle, a focal distance, and the like of a camera. The camera captures an image of an object whose length and position are clear in advance, and a camera parameter can be derived from the image. A strain may occur at both ends of the captured image, and there is a case where the vertical direction in the real world and the up-down direction in the image do not match. In contrast, an extent that the vertical direction in the real world is tilted in an image is clear by using a parameter of a camera that captures the image. Thus, a feature value of a keypoint can be derived in consideration of a difference between the real world and the image by normalizing, by a height, a value of the keypoint along a vertical projection axis projected in the image, based on the camera parameter. Note that, a left-right direction (a horizontal direction) is a direction (X-axis direction) of left and right in a two-dimensional coordinate (X-Y coordinate) space of an image, or is a direction in which a direction parallel to the ground in the three-dimensional coordinate space in the real world is projected in the two-dimensional coordinate space.

Herein, specific examples 1 to 3 of height pixel number computation processing will be described.

Specific Example 1

In the specific example 1, a height pixel number is derived by use of a length of a bone from a head portion to a foot portion. In the specific example 1, the person information generation unit 11 acquires a length of each bone, and adds up the acquired length of the each bone.

Figure 10:
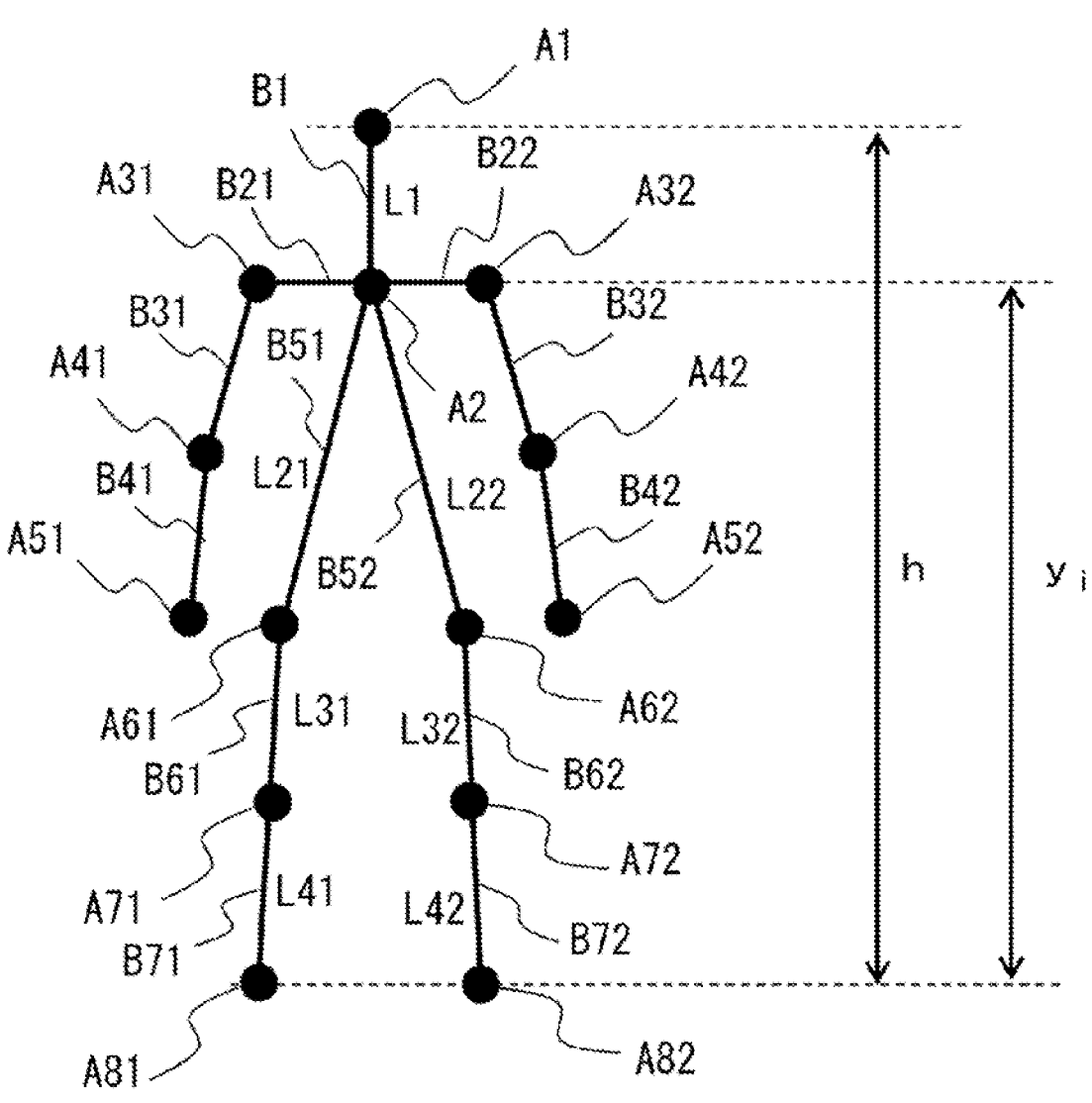
FIG. 10 is a diagram illustrating an example of a human model.

Then, the person information generation unit 11 acquires a length of a bone from a head portion to a foot portion of a person on a two-dimensional image, and derives a height pixel number. In other words, each length (pixel number) of a bone B1 (length L1), a bone B51 (length L21), a bone B61 (length L31), and a bone B71 (length L41), or the bone B1 (length L1), a bone B52 (length L22), a bone B62 (length L32), and a bone B72 (length L42) among bones in FIG. 10 is acquired from the image in which the skeleton structure is detected. A length of each bone can be derived from coordinates of each keypoint in the two-dimensional image. A value acquired by multiplying, by a correction constant, L1+L21+L31+L41 or L1+L22+L32+L42 acquired by adding them up is computed as a height pixel number (h). When both values can be computed, for example, a longer value is set as the height pixel number. In other words, each bone has a longest length in an image when being captured from front, and is displayed to be short when being tilted in a depth direction with respect to a camera. Therefore, it is conceivable that a longer bone has a higher possibility of being captured from the front, and has a value closer to a true value. Thus, a longer value is preferably selected.

Figure 11:
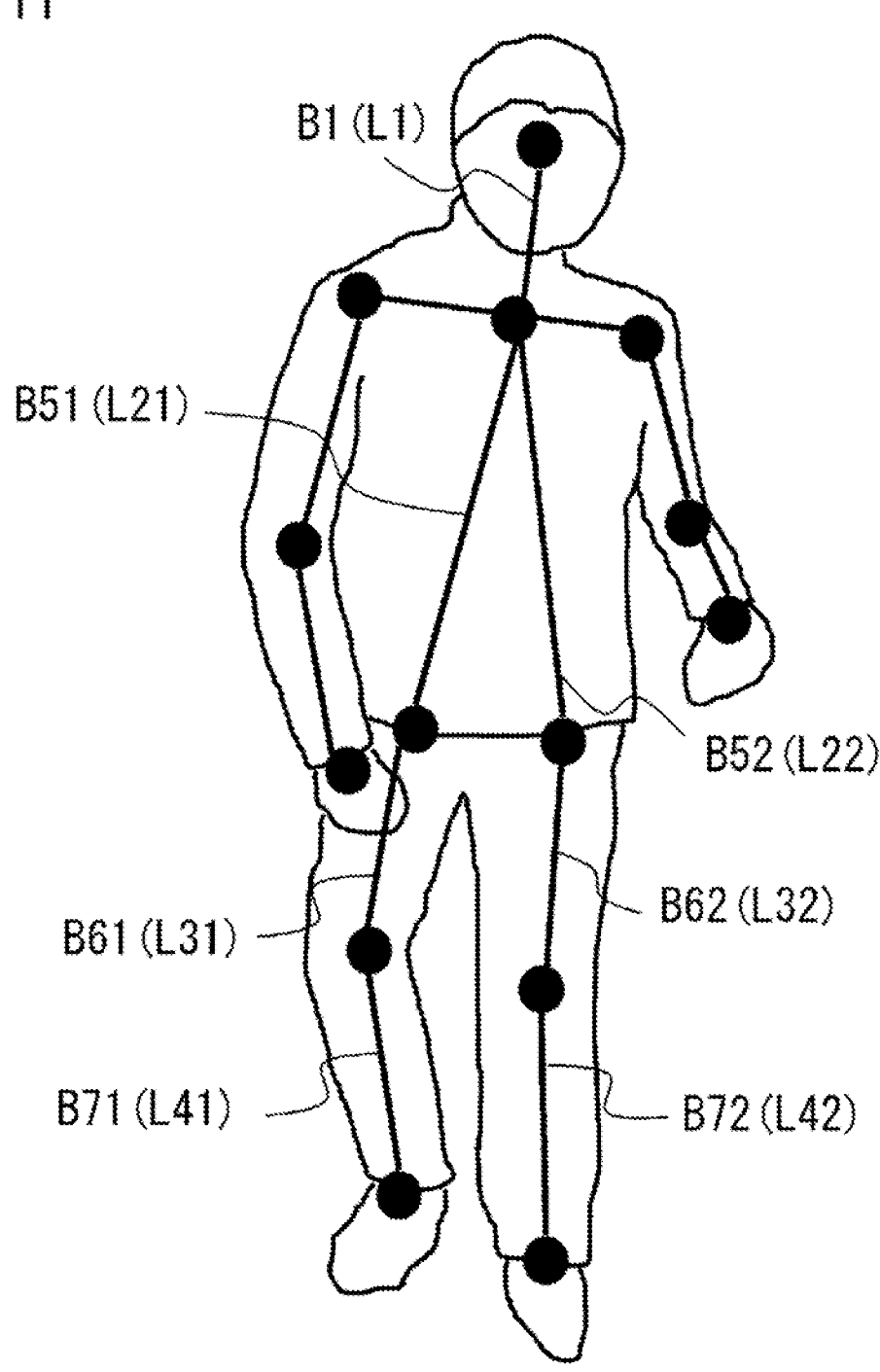
FIG. 11 is a diagram illustrating a detection example of a skeleton structure.

In an example of FIG. 11, the bone B1, the bone B51 and the bone B52, the bone B61 and the bone B62, and the bone B71 and the bone B72 are each detected without overlapping. L1+L21+L31+L41 and L1+L22+L32+L42 that are a total of the bones are derived, and, for example, a value acquired by multiplying, by a correction constant, L1+L22+L32+L42 on a left leg side having a longer length of the detected bones is set as the height pixel number.

Figure 12:
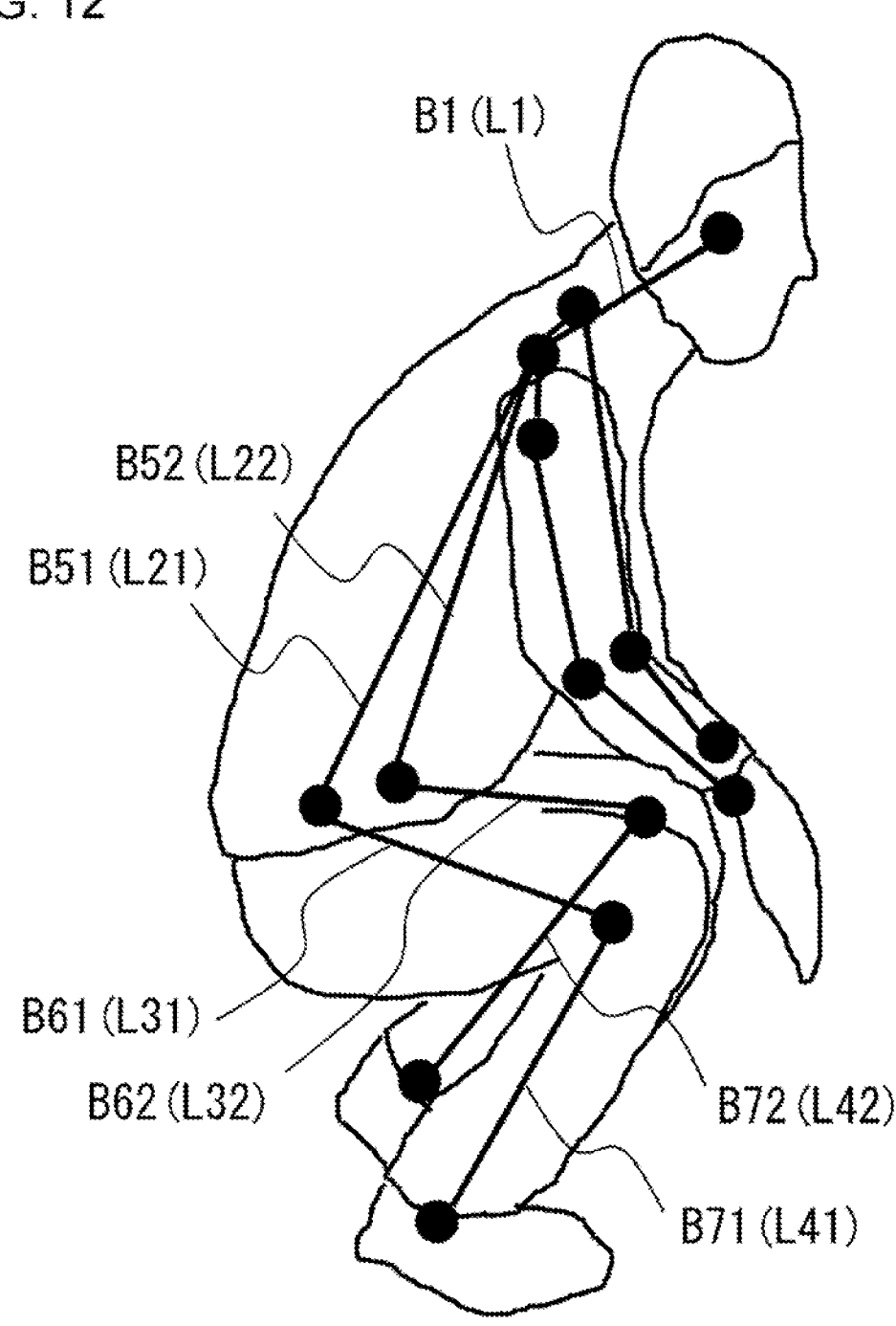
FIG. 12 is a diagram illustrating a detection example of a skeleton structure.

In an example of FIG. 12, the bone B1, the bone B51 and the bone B52, the bone B61 and the bone B62, and the bone B71 and the bone B72 are each detected, and the bone B61 and the bone B71 of a right leg, and the bone B62 and the bone B72 of a left leg overlap. L1+L21+L31+L41 and L1+L22+L32+L42 that are a total of the bones are derived, and, for example, a value acquired by multiplying, by a correction constant, L1+L21+L31+L41 on a right leg side having a longer length of the detected bones is set as the height pixel number.

Figure 13:
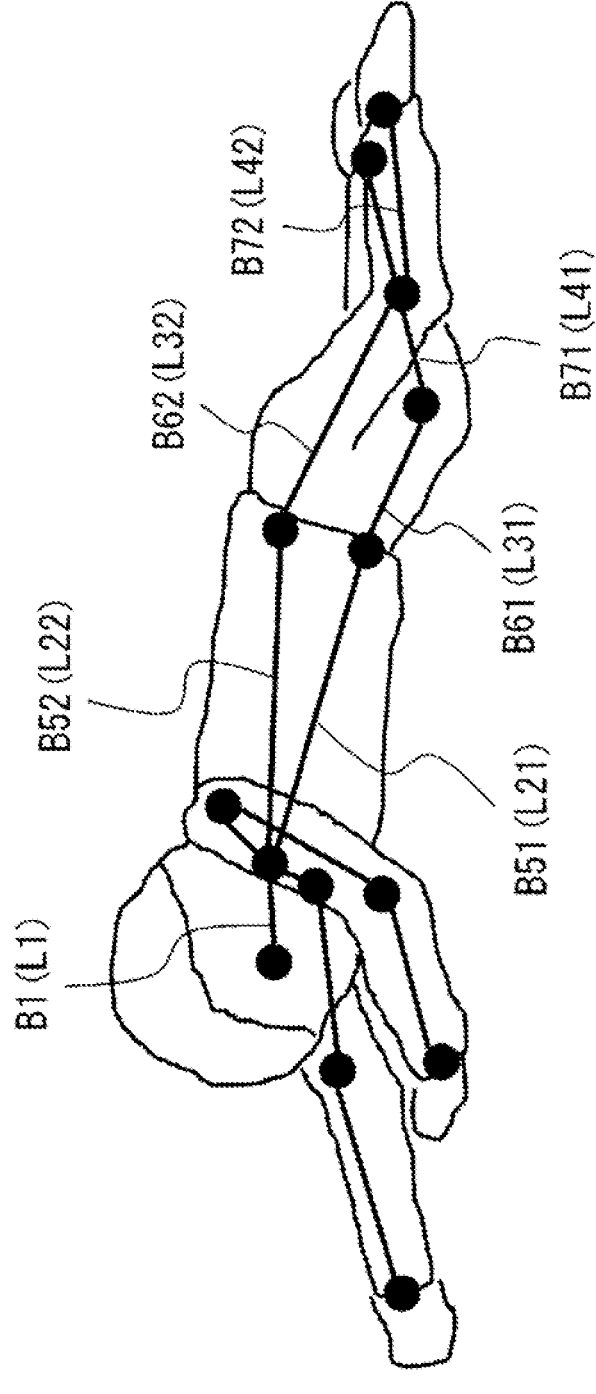
FIG. 13 is a diagram illustrating a detection example of a skeleton structure.

In an example of FIG. 13, the bone B1, the bone B51 and the bone B52, the bone B61 and the bone B62, and the bone B71 and the bone B72 are each detected, and the bone B61 and the bone B71 of the right leg, and the bone B62 and the bone B72 of the left leg overlap. L1+L21+L31+L41 and L1+L22+L32+L42 that are a total of the bones are derived, and, for example, a value acquired by multiplying, by a correction constant, L1+L22+L32+L42 on the left leg side having a longer length of the detected bones is set as the height pixel number.

In the specific example 1, since a height can be derived by adding up lengths of bones from a head to a foot, a height pixel number can be derived by a simple method. Further, since at least a skeleton from a head to a foot may be able to be detected by a skeleton detection technique using machine learning, a height pixel number can be accurately estimated even when the entire person is not necessarily captured in an image as in a squatting state and the like.

Specific Example 2

In the specific example 2, a height pixel number is derived by use of a two-dimensional skeleton model indicating a relationship between a length of a bone included in a two-dimensional skeleton structure and a length of a whole body of a person on a two-dimensional image space.

Figure 14:
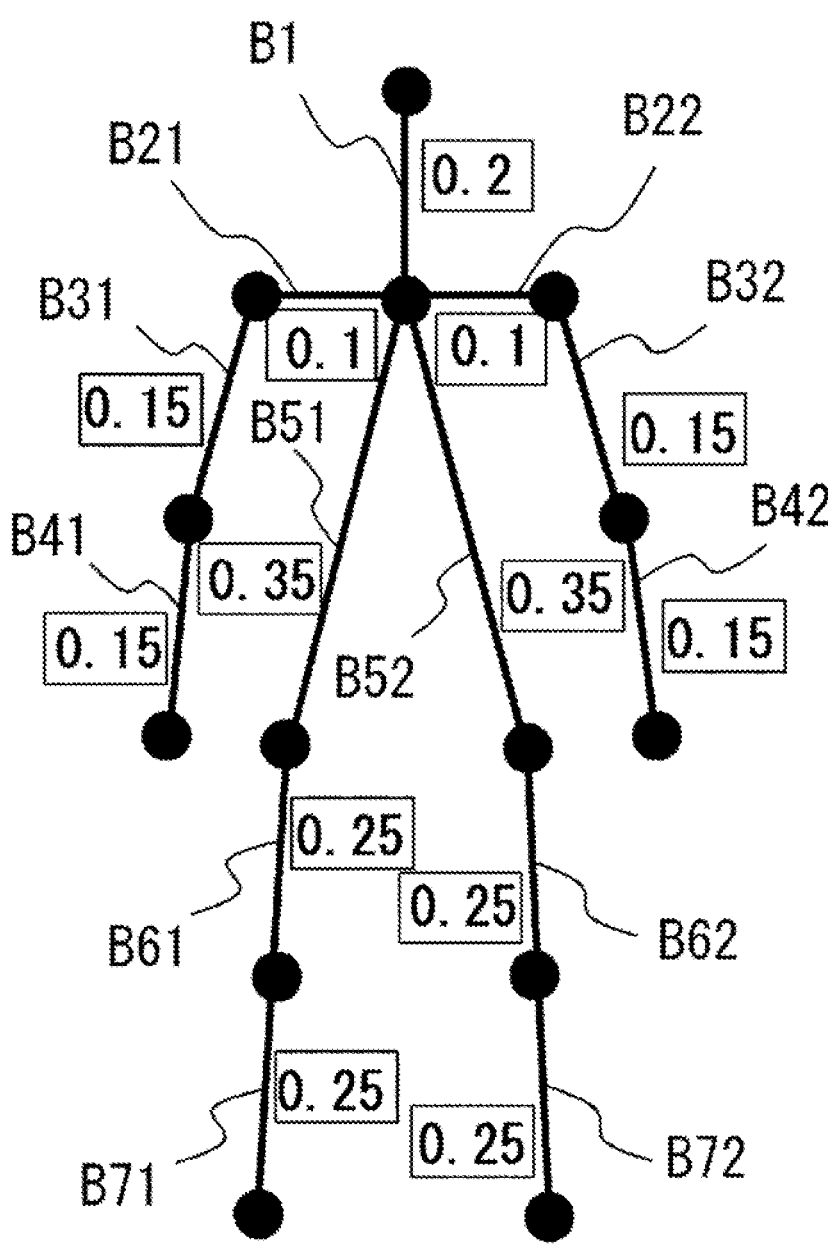
FIG. 14 is a diagram illustrating an example of a human model.

FIG. 14 is a human model (two-dimensional skeleton model) 301 that is used in the specific example 2 and indicates a relationship between a length of each bone on the two-dimensional image space and a length of a whole body on the two-dimensional image space. As illustrated in FIG. 14, a relationship between a length of each bone of an average person and a length of a whole body (a proportion of a length of each bone to a length of a whole body) is associated with each bone of the human model 301. For example, a length of the bone B1 of a head is the length of the whole body×0.2 (20%), a length of the bone B41 of a right hand is the length of the whole body×0.15 (15%), and a length of the bone B71 of the right leg is the length of the whole body×0.25 (25%). Information about such a human model 301 is stored in a database 110, and thus an average length of a whole body can be derived from a length of each bone. In addition to a human model of an average person, a human model may be prepared for each attribute of a person such as age, gender, and nationality. In this way, a length (height) of a whole body can be appropriately derived according to an attribute of a person.

Figure 15:
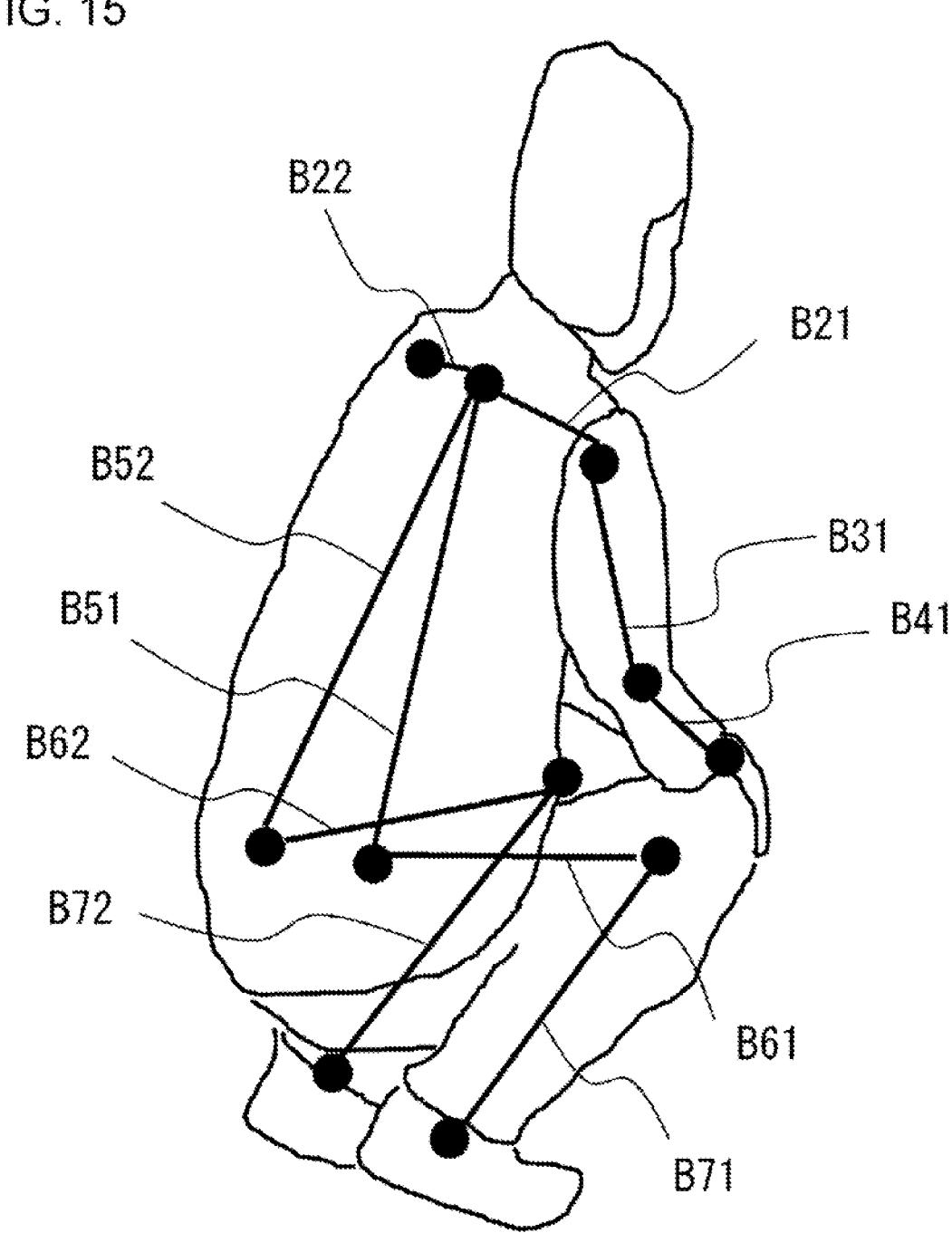
FIG. 15 is a diagram illustrating a detection example of a skeleton structure.

In the specific example 2, the person information generation unit 11 acquires a length of each bone. The person information generation unit 11 acquires a length of all bones (length on the two-dimensional image space) in a detected skeleton structure. FIG. 15 is an example of capturing a person in a squatting state from obliquely behind the right and detecting a skeleton structure. In this example, since a face and a left side surface of a person are not captured, a bone of a head, and bones of a left arm and a left hand cannot be detected. Thus, each length of bones B21, B22, B31, B41, B51, B52, B61, B62, B71, and B72 that are detected is acquired.

Subsequently, the person information generation unit 11 computes a height pixel number from a length of each bone, based on a human model. The person information generation unit 11 refers to the human model 301 indicating a relationship between lengths of each bone and a whole body as in FIG. 14, and derives a height pixel number from the length of each bone. For example, since a length of the bone B41 of the right hand is the length of the whole body×0.15, a height pixel number based on the bone B41 is derived from the length of the bone B41/0.15. Further, since a length of the bone B71 of the right leg is the length of the whole body×0.25, a height pixel number based on the bone B71 is derived from the length of the bone B71/0.25.

The human model referred to at this time is, for example, a human model of an average person, but the human model may be selected according to attributes of a person such as age, gender, and nationality. For example, when a face of a person is captured in a captured image, an attribute of the person is identified based on the face, and a human model associated with the identified attribute is referred to. An attribute of a person can be recognized from a feature of a face in an image by referring to information acquired by performing machine learning on a face for each attribute. Further, when an attribute of a person cannot be identified from an image, a human model of an average person may be used.

Further, a height pixel number computed from a length of a bone may be corrected by a camera parameter. For example, when a camera is placed in a high position and performs capturing in such a way that a person is looked down, a horizontal length such as a bone of a width of shoulders is not affected by a dip of the camera in a two-dimensional skeleton structure, but a vertical length such as a bone from a neck to a waist is reduced as a dip of the camera increases. Then, a height pixel number computed from the horizontal length such as a bone of a width of shoulders tends to be greater than an actual height pixel number. Thus, when a camera parameter is utilized, an extent of an angle at which a person is looked down by the camera is clear, and thus a correction can be performed in such a way as to acquire a two-dimensional skeleton structure captured from the front by using information about the dip. In this way, a height pixel number can be more accurately computed.

Figure 16:
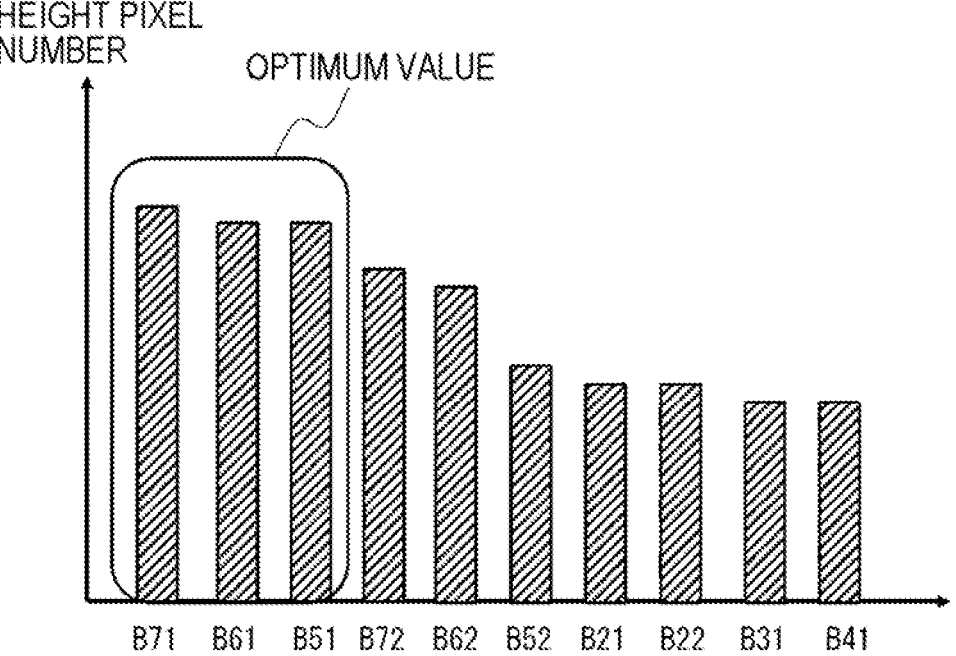
FIG. 16 is a histogram for describing a height pixel number computation method.

Subsequently, the person information generation unit 11 computes an optimum value of the height pixel number. The person information generation unit 11 computes an optimum value of the height pixel number from the height pixel number derived for each bone. For example, a histogram of a height pixel number derived for each bone as illustrated in FIG. 16 is generated, and a great height pixel number is selected from among the height pixel numbers. In other words, a longer height pixel number is selected from among a plurality of height pixel numbers derived based on a plurality of bones. For example, top 30% is set as a valid value, and height pixel numbers by the bones B71, B61, and B51 are selected in FIG. 16. An average of the selected height pixel numbers may be derived as an optimum value, or a greatest height pixel number may be set as an optimum value. Since a height is derived from a length of a bone in a two-dimensional image, when the bone cannot be captured from the front, i.e., when the bone tilted in the depth direction as viewed from the camera is captured, a length of the bone is shorter than that captured from the front. Then, a value having a greater height pixel number has a higher possibility of being captured from the front than a value having a smaller height pixel number and is a more plausible value, and thus a greater value is set as an optimum value.

In the specific example 2, since a height pixel number is derived based on a bone of a detected skeleton structure by use of a human model indicating a relationship between lengths of a bone and a whole body on the two-dimensional image space, a height pixel number can be derived from some of bones even when all skeletons from a head to a foot cannot be acquired. Particularly, a height pixel number can be accurately estimated by adopting a greater value among values derived from a plurality of bones.

Specific Example 3

In the specific example 3, a skeleton vector of a whole body is derived by fitting a detected two-dimensional skeleton structure to a three-dimensional human model (three-dimensional skeleton model) and using a height pixel number of the fit three-dimensional human model.

In the specific example 3, the person information generation unit 11 first computes a camera parameter, based on an image captured by the camera. The person information generation unit 11 extracts an object whose length is clear in advance from a plurality of images captured by the camera, and derives a camera parameter from a size (pixel number) of the extracted object. Note that, a camera parameter may be derived in advance, and the derived camera parameter may be acquired as necessary.

Subsequently, the person information generation unit 11 adjusts an arrangement and a height of a three-dimensional human model. The person information generation unit 11 prepares, for a detected two-dimensional skeleton structure, the three-dimensional human model for a height pixel number computation, and arranges the prepared three-dimensional human model in the same two-dimensional image, based on the camera parameter. Specifically, a "relative positional relationship between a camera and a person in a real world" is determined from the camera parameter and the two-dimensional skeleton structure. For example, when assuming that a position of the camera has coordinates (0, 0, 0), coordinates (x, y, z) of a position where a person is standing (or sitting) are determined. Then, by assuming an image captured when the three-dimensional human model is arranged in the same position (x, y, z) as that of the determined person, the two-dimensional skeleton structure and the three-dimensional human model are superimposed.

Figure 17:
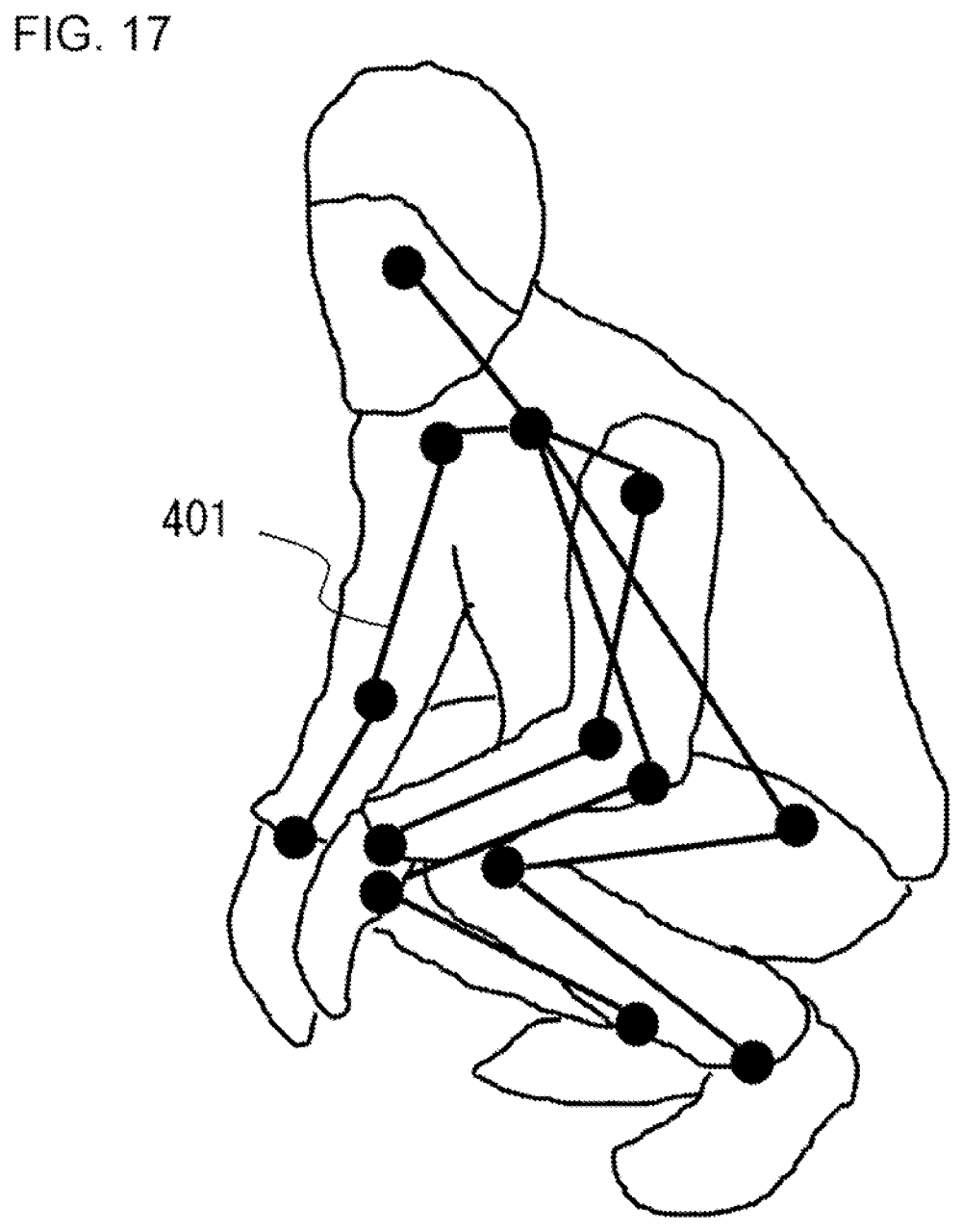
Figure 18:
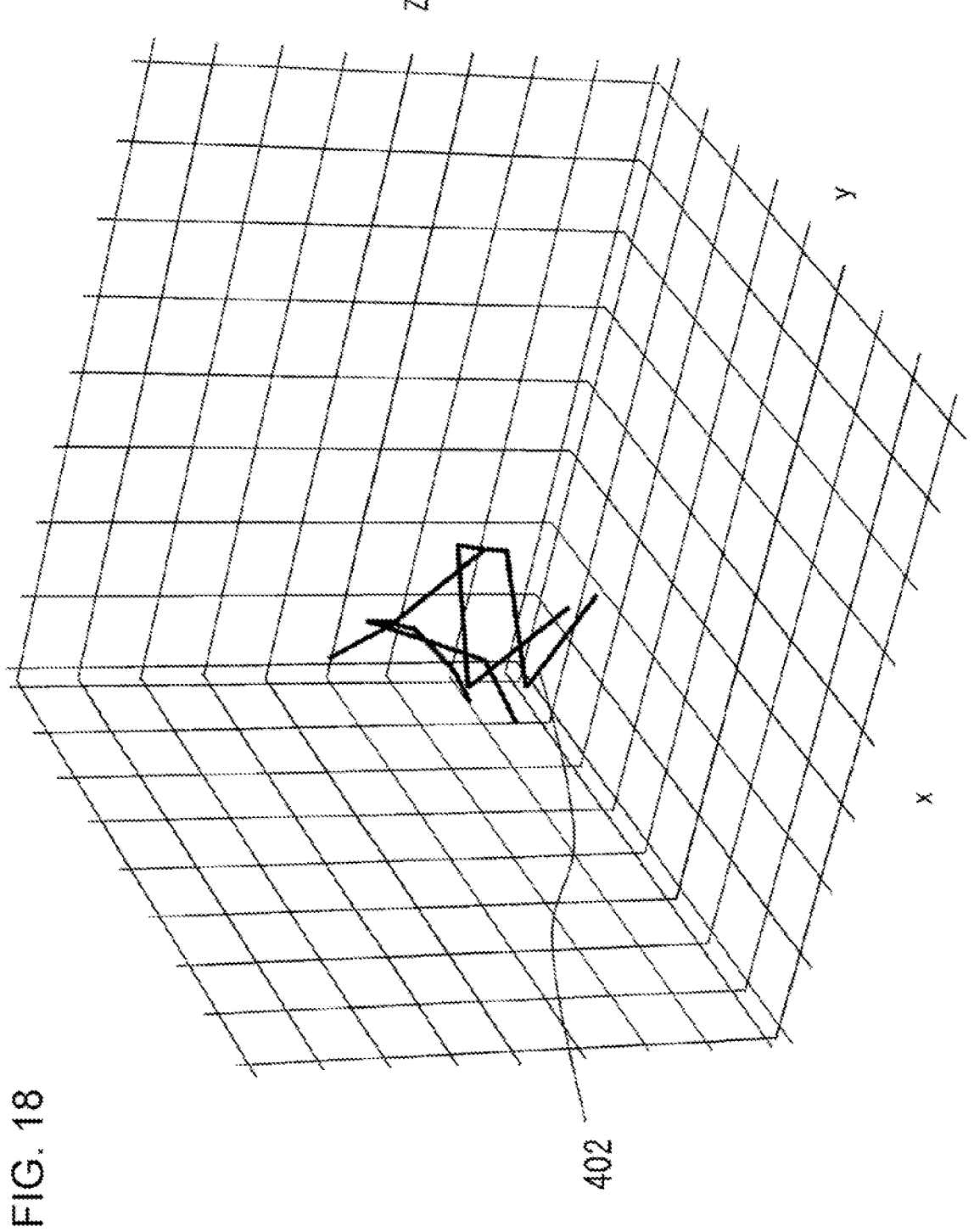
FIG. 18 is a diagram illustrating an example of a three-dimensional human model.

FIG. 17 is an example of capturing a squatting person from a left oblique front and detecting a two-dimensional skeleton structure 401. The two-dimensional skeleton structure 401 includes two-dimensional coordinate information. Note that, all of bones are preferably detected, but some of bones may not be detected. A three-dimensional human model 402 as in FIG. 18 is prepared for the two-dimensional skeleton structure 401. The three-dimensional human model (three-dimensional skeleton model) 402 is a model of a skeleton including three-dimensional coordinate information and having the same shape as that of the two-dimensional skeleton structure 401. Then, as in FIG. 19, the prepared three-dimensional human model 402 is arranged and superimposed on the detected two-dimensional skeleton structure 401. Further, the three-dimensional human model 402 is superimposed on the two-dimensional skeleton structure 401, and a height of the three-dimensional human model 402 is also adjusted to the two-dimensional skeleton structure 401.

Figure 19:
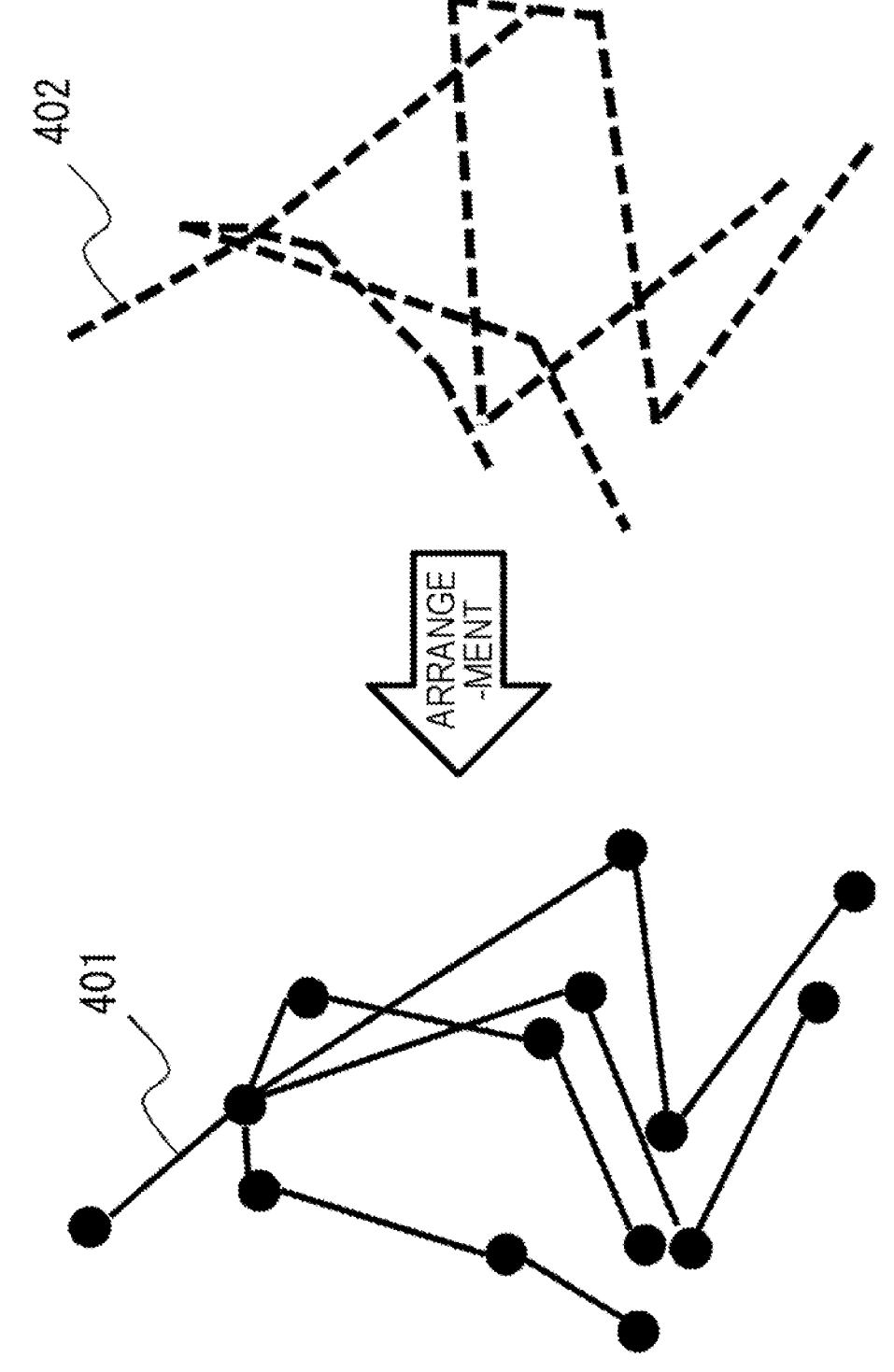
FIG. 19 is a diagram for describing the height pixel number computation method.

Note that, the three-dimensional human model 402 prepared at this time may be a model in a state close to a pose of the two-dimensional skeleton structure 401 as in FIG. 19, or may be a model in an upright state. For example, the three-dimensional human model 402 with an estimated pose may be generated by use of a technique for estimating the pose in a three-dimensional space from a two-dimensional image by use of machine learning. A three-dimensional pose can be estimated from a two-dimensional image by learning information about a joint in the two-dimensional image and information about a joint in a three-dimensional space.

Figure 20:
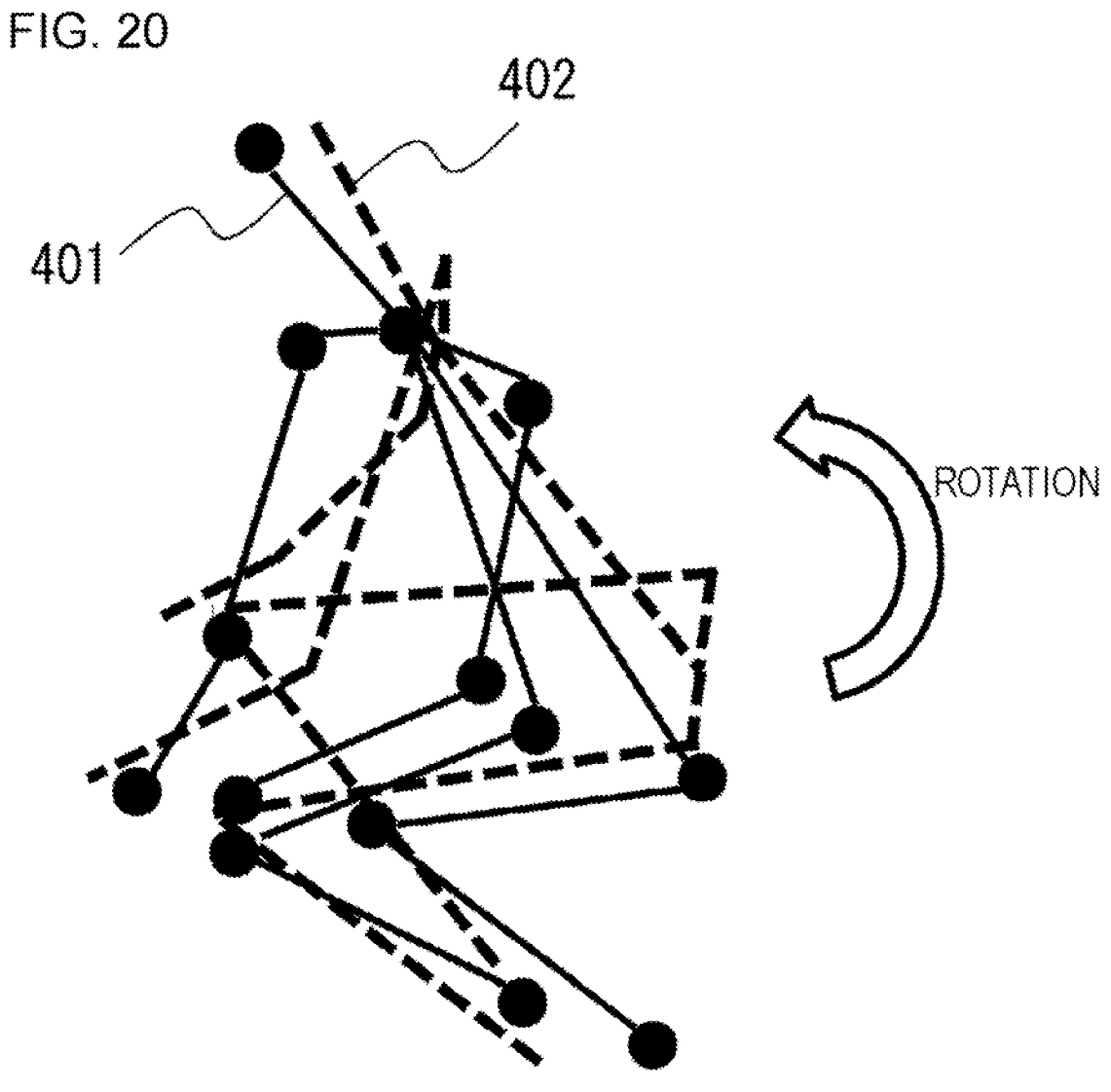
FIG. 20 is a diagram for describing the height pixel number computation method.

Subsequently, the person information generation unit 11 fits the three-dimensional human model to a two-dimensional skeleton structure. As in FIG. 20, the person information generation unit 11 deforms the three-dimensional human model 402 in such a way that poses of the three-dimensional human model 402 and the two-dimensional skeleton structure 401 match in a state where the three-dimensional human model 402 is superimposed on the two-dimensional skeleton structure 401. In other words, a height, an orientation of a body, and an angle of a joint of the three-dimensional human model 402 are adjusted, and optimization is performed in such a way as to eliminate a difference from the two-dimensional skeleton structure 401. For example, an operation is performed, such as rotating a joint of the three-dimensional human model 402 in a movable range of a person, rotating the entire three-dimensional human model 402, or adjusting a size of the entire three-dimensional human model 402. Note that, fitting (application) between a three-dimensional human model and a two-dimensional skeleton structure is performed on a two-dimensional space (two-dimensional coordinates). In other words, a three-dimensional human model is mapped to a two-dimensional space, and the three-dimensional human model is optimized for a two-dimensional skeleton structure in consideration of change of the deformed three-dimensional human model in the two-dimensional space (image).

Figure 21:
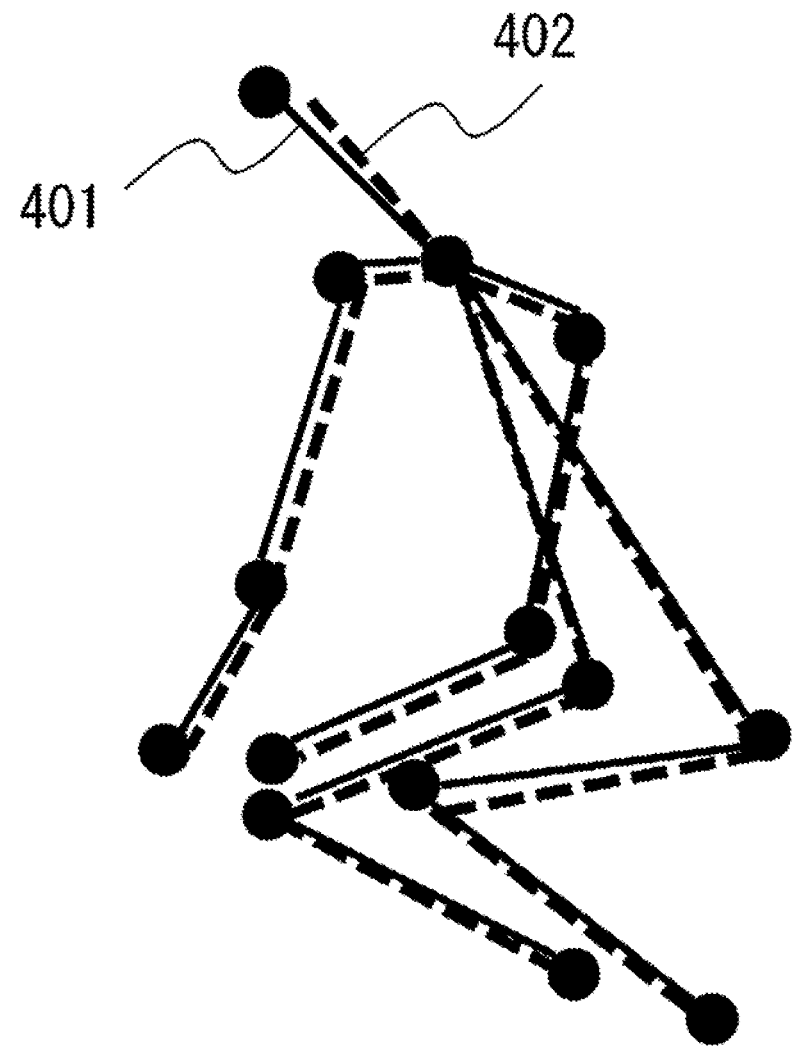
FIG. 21 is a diagram for describing the height pixel number computation method.

Subsequently, the person information generation unit 11 computes a height pixel number of the fit three-dimensional human model. As in FIG. 21, when there is no difference between the three-dimensional human model 402 and the two-dimensional skeleton structure 401 and poses match, the person information generation unit 11 derives a height pixel number of the three-dimensional human model 402 in the state. With the optimized three-dimensional human model 402 in an upright state, a length of a whole body on the two-dimensional space is derived based on a camera parameter. For example, a height pixel number is computed from lengths (pixel numbers) of bones from a head to a foot when the three-dimensional human model 402 is upright. Similarly to the specific example 1, the lengths of the bones from the head portion to the foot portion of the three-dimensional human model 402 may be added up.

In the specific example 3, a height pixel number is derived based on a three-dimensional human model by fitting the three-dimensional human model to a two-dimensional skeleton structure, based on a camera parameter, and thus the height pixel number can be accurately estimated even when all bones are not captured at the front, i.e., when an error is great due to all bones being captured obliquely.

Next, normalization processing will be described. The person information generation unit 11 performs normalization processing after the height pixel number computation processing. In the normalization processing, the person information generation unit 11 computes a keypoint height. The person information generation unit 11 computes a keypoint height (pixel number) of all keypoints included in the detected skeleton structure. The keypoint height is a length (pixel number) in the height direction from a lowest end (for example, a keypoint of any foot) of the skeleton structure to the keypoint. Herein, as one example, the keypoint height is derived from a Y coordinate of the keypoint in an image. Note that, as described above, the keypoint height may be derived from a length in a direction along a vertical projection axis based on a camera parameter. For example, in the example in FIG. 10, a height ($y_i$) of a keypoint A2 of a neck is a value acquired by subtracting a Y coordinate of a keypoint A81 of a right foot or a keypoint A82 of a left foot from a Y coordinate of the keypoint A2.

Subsequently, the person information generation unit 11 determines a reference point for normalization. The reference point for normalization is a point being a reference for representing a relative height of a keypoint. The reference point for normalization may be set in advance, or may be able to be selected by a user. The reference point for normalization is preferably at the center of the skeleton structure or higher than the center (in an upper half of an image in the up-down direction), and, for example, coordinates of a keypoint of a neck can be set as the reference point for normalization. Note that, coordinates of a keypoint of a head or another portion instead of a neck may be set as the reference point for normalization. Instead of a keypoint, any coordinates (center coordinates in the skeleton structure, and the like) may be set as the reference point for normalization.

Subsequently, the person information generation unit 11 normalizes the keypoint height ($y_i$) by the height pixel number. The person information generation unit 11 normalizes each keypoint by use of the keypoint height of each keypoint, the reference point for normalization, and the height pixel number. Specifically, the person information generation unit 11 normalizes, by the height pixel number, a relative height of a keypoint with respect to the reference point for normalization. Herein, as an example of focusing only on the height direction, only a Y coordinate is extracted, and normalization is performed with the reference point for normalization as the keypoint of the neck. Specifically, with a Y coordinate of the reference point for normalization (keypoint of the neck) as (yc), a feature value (normalization value) is derived by use of the following equation (1). Note that, when a vertical projection axis based on a camera parameter is used, (yi) and (yc) are converted into values in a direction along the vertical projection axis.

[Mathematics 1]

$$f_i = (y_i - y_c)/h \tag{1}$$

For example, when the number of keypoints is 18, 18 coordinates (x0, y0), (x1, y1), . . . and (x17, y17) of the keypoints are converted into 18-dimensional feature values as follows by use of the above-described equation (1).

[Mathematics 2]

$$f_0 = (y_0 - y_c)/h \tag{2}$$
$$f_1 = (y_1 - y_c)/h$$
$$\vdots$$
$$f_{17} = (y_{17} - y_c)/h$$

Figure 22:
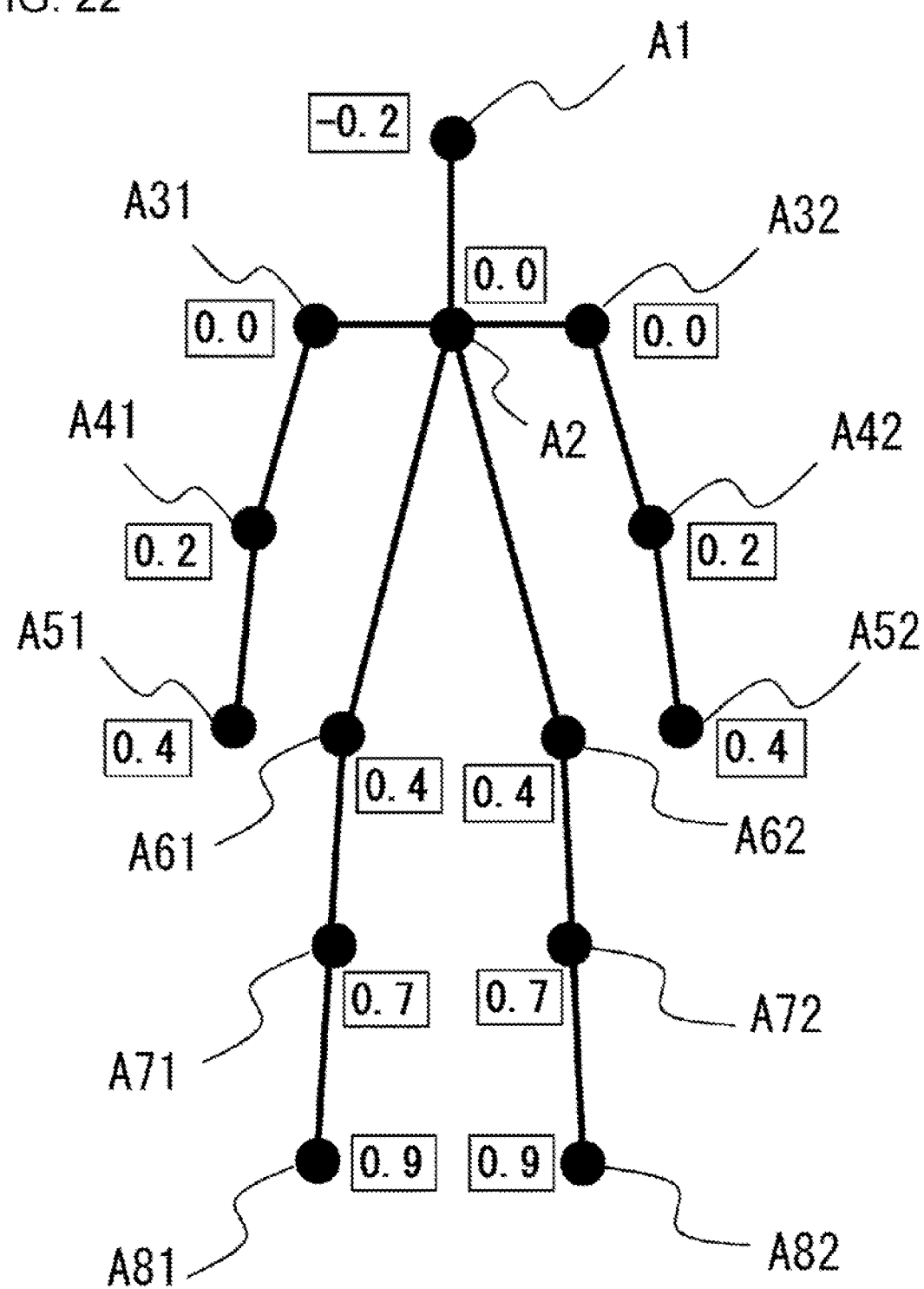
FIG. 22 is a diagram for describing a normalization method.
Figure 23:
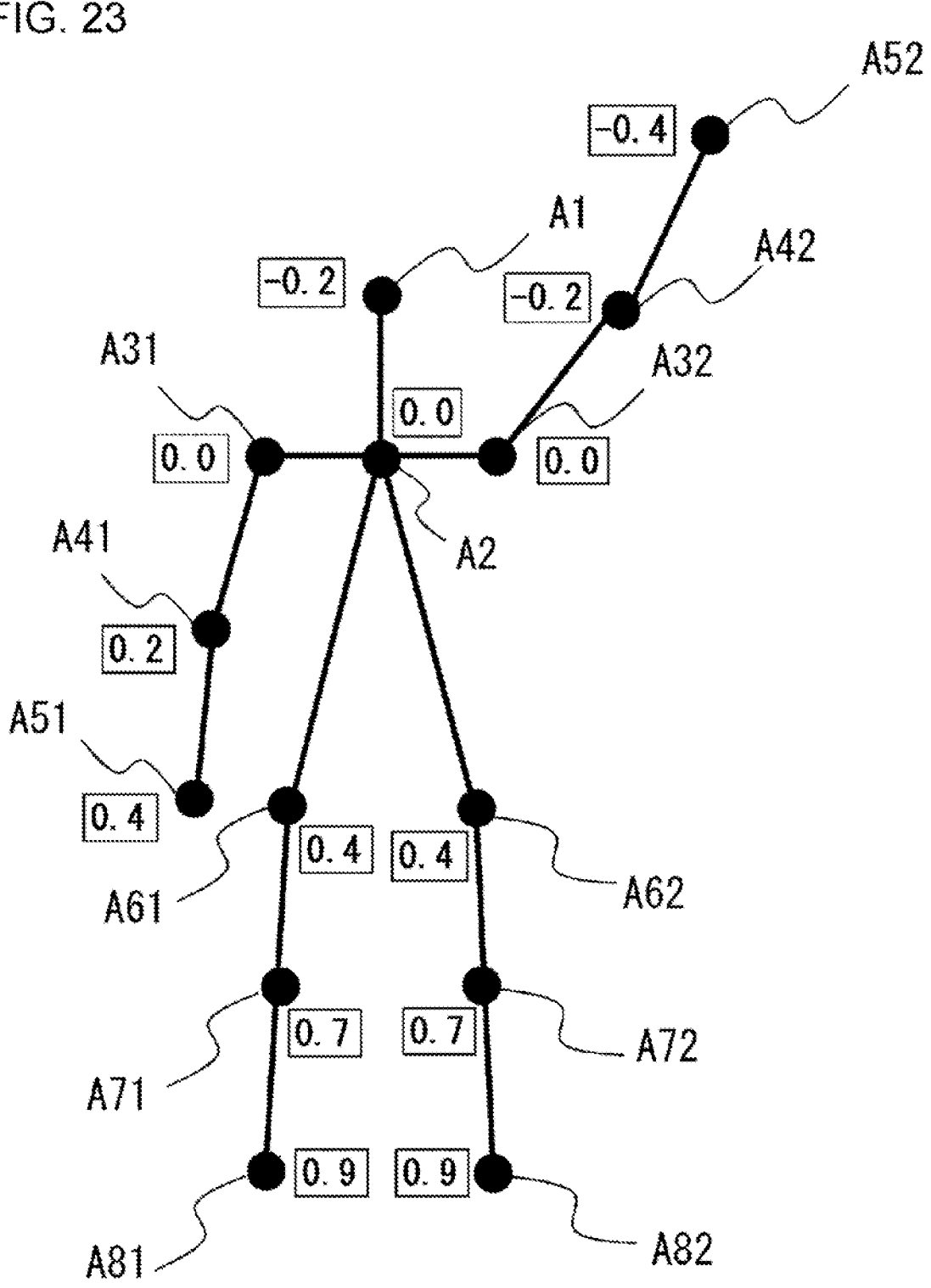
FIG. 23 is a diagram for describing the normalization method.
Figure 24:
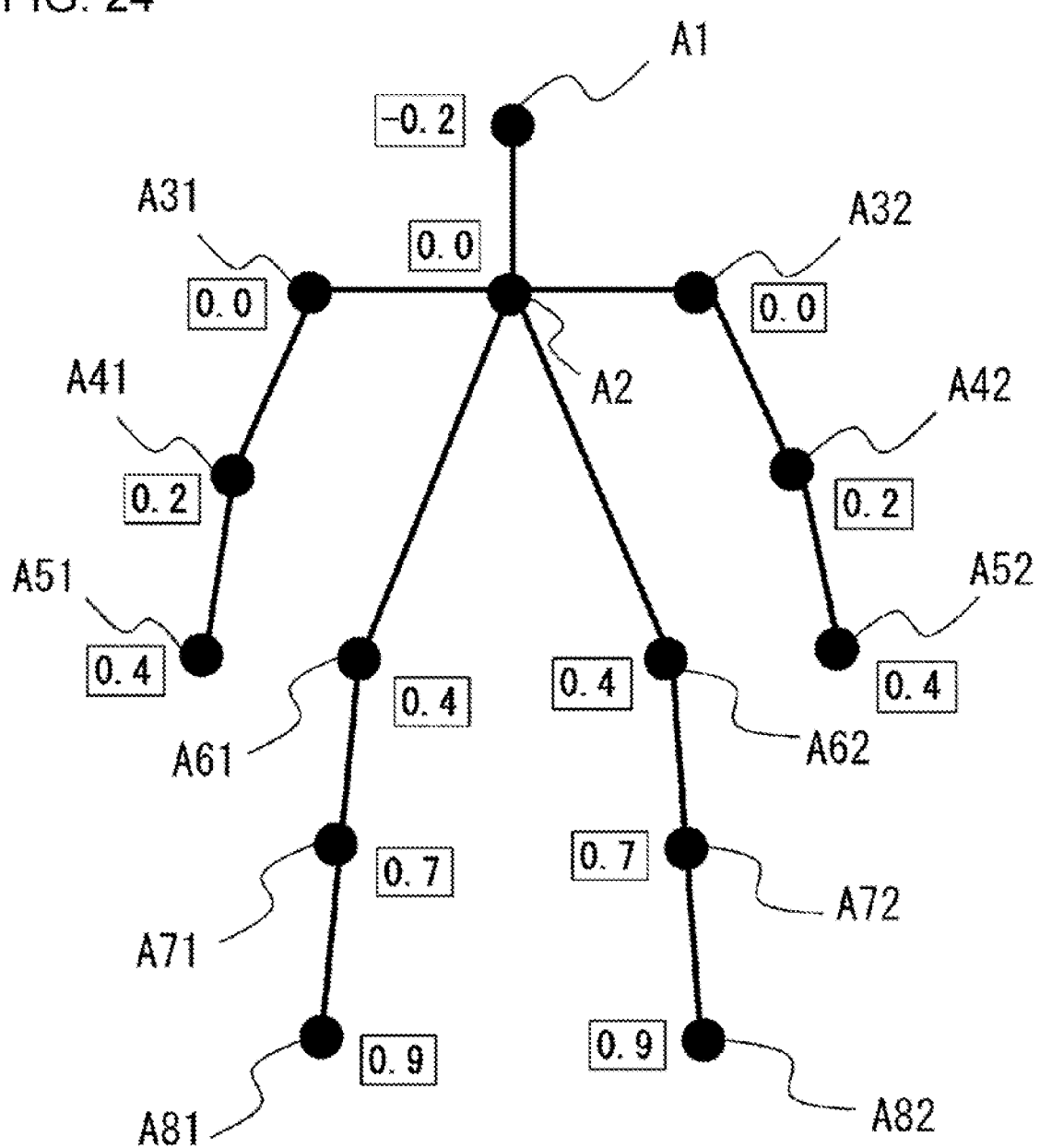
FIG. 24 is a diagram for describing the normalization method.

FIG. 22 illustrates an example of a feature value of each keypoint derived by the person information generation unit 11. In this example, since the keypoint A2 of the neck is the reference point for normalization, a feature value of the keypoint A2 is 0.0, and a feature value of a keypoint A31 of a right shoulder and a keypoint A32 of a left shoulder at the same height as the neck is also 0.0. A feature value of a keypoint A1 of a head higher than the neck is −0.2. A feature value of a keypoint A51 of a right hand and a keypoint A52 of a left hand lower than the neck is 0.4, and a feature value of the keypoint A81 of the right foot and the keypoint A82 of the left foot is 0.9. When the person raises the left hand from this state, the left hand becomes higher than the reference point for normalization as in FIG. 23, and thus a feature value of the keypoint A52 of the left hand becomes −0.4. Meanwhile, since normalization is performed by use of only a coordinate of the Y-axis, as in FIG. 24, a feature value does not change as compared to FIG. 22 even when a width of the skeleton structure changes. In other words, a feature value (normalization value) according to the present example embodiment indicates a feature of a skeleton structure (keypoint) in the height direction (Y direction), and is not affected by a change of the skeleton structure in the horizontal direction (X direction).

As described above, the detection apparatus 10 of the present example embodiment achieves an advantageous effect similar to that according to the first example embodiment. Further, the detection apparatus 10 of the present example embodiment detects a skeleton structure of a person from a two-dimensional image, and normalizes each keypoint of the skeleton structure by use of a height pixel number (upright height on a two-dimensional image space) derived from the detected skeleton structure. Robustness during various pieces of processing using the feature value can be improved by use of the normalized feature value. In other words, since a feature value according to the present example embodiment is not affected by a change of a person in the horizontal direction as described above, robustness against a change in an orientation of the person and a body shape of the person is great.

Further, the detection apparatus 10 according to the present example embodiment can be achieved by detecting a skeleton structure of a person by use of a skeleton detection technique such as OpenPose, and thus learning data that learn a pose and the like of a person do not need to be prepared. Further, a clear and simple feature value can be acquired by normalizing a keypoint of a skeleton structure, and thus persuasion of a user for a processing result is high unlike a black-box type algorithm as in machine learning.

MODIFICATION EXAMPLE

Hereinafter, modification examples being applicable to the first and second example embodiments will be described.

First Modification Example

According to the first and second example embodiments, a skeleton structure of a person is detected from an image generated by a camera, and various pieces of person information such as a position and a pose of the person are generated based on the detected skeleton structure of the person. As a modification example, at least a part (or all) of person information may be generated by analyzing an image generated by a camera or the like as it is (based on a feature of appearance of a person indicated by an image), without utilizing a detection result of a skeleton structure of the person. In a case of the modification example, an analysis being robust against a change in a lighting condition is not achieved among advantageous effects described in the first and second example embodiments, but other advantageous effects are achieved.

Second Modification Example

In the first and second example embodiments, the detection apparatus 10 is an apparatus to be installed on a moving body. As a modification example, the detection apparatus 10 may be a server installed at a location being away from a moving body. Then, the detection apparatus 10 may communicate with a system installed on the moving body, and acquire an image generated by a camera that captures an interior of the moving body, or transmit a detection result by a detecting unit 13 to a system installed in the moving body via an output unit 14.

While the example embodiments of the present invention have been described above with reference to the drawings, the example embodiments are only exemplifications of the present invention, and various configurations other than the above can also be adopted.

Further, in a plurality of flowcharts used in the above description, a plurality of steps (pieces of processing) are described in order, but an execution order of the steps executed in each example embodiment is not limited to the described order. In each example embodiment, an order of the illustrated steps can be changed within a range that does not interfere with the contents. Further, each example embodiment described above can be combined within a range in which the contents do not conflict with each other.

Some or all of the above-described example embodiments may also be described in supplementary notes below, but is not limited thereto.

1. A detection apparatus including:

an equipment information acquisition unit that acquires equipment information indicating a position of equipment being present in an interior of a moving body;

a person information generation unit that determines a position of a person being present in the interior of the moving body, based on an image indicating the interior of the moving body, and generates person information indicating the position of the person; and a detection unit that detects a danger state occurring in the interior of the moving body, based on the equipment information and the person information.

2. The detection apparatus according to supplementary note 1, wherein the person information generation unit generates information indicating a position of a predetermined place of a body of a person as the person information indicating the position of the person.

3. The detection apparatus according to supplementary note 1 or 2, wherein the person information generation unit generates, based on the equipment information, the person information indicating a relative positional relationship between a position of the equipment and a position of the person.

4. The detection apparatus according to any one of supplementary notes 1 to 3, wherein the person information generation unit detects a skeleton structure of a person included in the image, and determines a position of the person, based on the detected skeleton structure of the person.

5. The detection apparatus according to any one of supplementary notes 1 to 4, wherein the person information generation unit detects a skeleton structure of a person included in the image, determines a pose of a person, based on the detected skeleton structure of the person, and generates the person information further indicating the pose of the person.

6. The detection apparatus according to any one of supplementary notes 1 to 5, wherein the person information generation unit detects a skeleton structure of a person included in the image, determines a reference point, based on a plurality of predetermined places in the skeleton structure of the person, and generates the person information further indicating a time change of a position of the reference point.

7. The detection apparatus according to any one of supplementary notes 1 to 6, wherein the detection unit acquires moving body state information indicating a state of the moving body, and detects the danger state by a detection method according to the state of the moving body.

8. The detection apparatus according to any one of supplementary notes 1 to 7, wherein equipment being present in the interior of the moving body includes at least one of a strap, a handrail, and a seat.

9. A detection method including, by a computer:

acquiring equipment information indicating a position of equipment being present in an interior of a moving body;

determining a position of a person being present in the interior of the moving body, based on an image indicating the interior of the moving body, and generating person information indicating the position of the person; and detecting a danger state occurring in the interior of the moving body, based on the equipment information and the person information.

10. A program causing a computer to function as:

an equipment information acquisition unit that acquires equipment information indicating a position of equipment being present in an interior of a moving body;

a person information generation unit that determines a position of a person being present in the interior of the moving body, based on an image indicating the interior of the moving body, and generates person information indicating the position of the person; and a detection unit that detects a danger state occurring in the interior of the moving body, based on the equipment information and the person information.

REFERENCE SIGNS LIST

10 Detection apparatus
11 Person information generation unit
12 Equipment information acquisition unit
13 Detection unit
1A Processor
2A Memory
3A Input/output I/F
4A Peripheral circuit
5A Bus
401 Two-dimensional skeleton structure
402 Three-dimensional human model

What is claimed is:

1. A detection apparatus comprising:

at least one memory configured to store one or more instructions; and at least one processor configured to execute the one or more instructions to:

acquire equipment information indicating a position of equipment being present in an interior of a moving body;

generate person information by analyzing an image indicating the interior of the moving body, detecting a skeleton structure comprising a plurality of keypoints and bones of a person in the image, and determining a position of a specific body part of the person based on the detected skeleton structure;

detect a danger state occurring in the interior of the moving body, based on the equipment information and the person information; and in response to detecting the danger state, automatically output a control signal to a system that controls an operation of the moving body or an automatic notification indicating content of the danger state to an output device.

2. The detection apparatus according to claim 1, wherein the at least one processor is further configured to execute the one or more instructions to generate information indicating a position of a predetermined place of a body of a person as the person information indicating the position of the person.

3. The detection apparatus according to claim 1, wherein the at least one processor is further configured to execute the one or more instructions to generate, based on the equipment information, the person information indicating a relative positional relationship between a position of the equipment and a position of the person.

4. The detection apparatus according to claim 1, wherein the at least one processor is further configured to execute the one or more instructions to detect the skeleton structure of a person included in the image, and determine a position of the person, based on the detected skeleton structure of the person.

5. The detection apparatus according to claim 1, wherein the at least one processor is further configured to execute the one or more instructions to detect the skeleton structure of a person included in the image, determine a pose of a person, based on the detected skeleton structure of the person, and generate the person information further indicating the pose of the person.

6. The detection apparatus according to claim 1, wherein the at least one processor is further configured to execute the one or more instructions to detect the skeleton structure of a person included in the image, determine a reference point, based on a plurality of predetermined places in the skeleton structure of the person, and generate the person information further indicating a time change of a position of the reference point.

7. The detection apparatus according to claim 1, wherein the at least one processor is further configured to execute the one or more instructions to acquire moving body state information indicating a state of the moving body, and detect the danger state by a detection method according to the state of the moving body.

8. The detection apparatus according to claim 1, wherein equipment being present in the interior of the moving body includes at least one of a strap, a handrail, and a seat.

9. The detection apparatus according to claim 1, wherein the processor is further configured to execute the one or more instructions to:

estimate a usage state of the equipment by the person, based on a relative positional relationship between the position of the equipment and the position of the person in the interior of the moving body; and detect the danger state occurring in the interior of the moving body, based on a result of the estimation.

10. A detection method comprising, by a computer:

acquiring equipment information indicating a position of equipment being present in an interior of a moving body;

generating person information by analyzing an image indicating the interior of the moving body, detecting a skeleton structure comprising a plurality of key-points and bones of a person in the image, and determining a position of a specific body part of the person based on the detected skeleton structure;

detecting a danger state occurring in the interior of the moving body, based on the equipment information and the person information; and in response to detecting the danger state, automatically outputting a control signal to a system that controls an operation of the moving body or an automatic notification indicating content of the danger state to an output device.

11. A non-transitory storage medium storing a program causing a computer to:

acquire equipment information indicating a position of equipment being present in an interior of a moving body;

generate person information by analyzing an image indicating the interior of the moving body, detecting a skeleton structure comprising a plurality of keypoints and bones of a person in the image, and determining a position of a specific body part of the person based on the detected skeleton structure;

detect a danger state occurring in the interior of the moving body, based on the equipment information and the person information; and in response to detecting the danger state, automatically output a control signal to a system that controls an operation of the moving body or an automatic notification indicating content of the danger state to an output device.

* * * * *